United States Patent
Park et al.

(10) Patent No.: US 11,982,820 B2
(45) Date of Patent: May 14, 2024

(54) LENS MOVING APPARATUS

(71) Applicant: LG INNOTEK CO., LTD., Seoul (KR)

(72) Inventors: Sang Ok Park, Seoul (KR); Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 626 days.

(21) Appl. No.: 16/941,203

(22) Filed: Jul. 28, 2020

(65) Prior Publication Data

US 2020/0355934 A1 Nov. 12, 2020

Related U.S. Application Data

(63) Continuation of application No. 16/029,182, filed on Jul. 6, 2018, now Pat. No. 10,761,339, which is a
(Continued)

(30) Foreign Application Priority Data

Nov. 14, 2014 (KR) .......................... 10-2014-0158683
Nov. 14, 2014 (KR) .......................... 10-2014-0158686

(51) Int. Cl.
*G02B 27/64* (2006.01)
*G02B 7/08* (2021.01)
(Continued)

(52) U.S. Cl.
CPC ............. *G02B 27/646* (2013.01); *G02B 7/08* (2013.01); *G03B 5/02* (2013.01); *G03B 5/04* (2013.01);
(Continued)

(58) Field of Classification Search
CPC .......... G02B 27/646; G02B 7/08; G02B 7/04; G02B 7/09; G02B 27/642; G02B 27/644;
(Continued)

(56) References Cited

U.S. PATENT DOCUMENTS 10,761,339 B2 * 9/2020 Park .......................... G03B 5/04
2012/0229901 A1 9/2012 Moriya et al.
(Continued)

FOREIGN PATENT DOCUMENTS

CN 101563836 A 10/2009
CN 102472944 A 5/2012
(Continued)

OTHER PUBLICATIONS

Office Action dated Sep. 19, 2022 in Chinese Application No. 202110420824.4.
(Continued)

*Primary Examiner* — James C. Jones
*Assistant Examiner* — Henry Duong
(74) *Attorney, Agent, or Firm* — Saliwanchik, Lloyd & Eisenschenk

(57) ABSTRACT

A lens moving apparatus includes a bobbin including a first coil disposed therearound, a first magnet disposed to face the first coil, a housing for supporting the first magnet, upper and lower elastic members each coupled to both the bobbin and the housing, a base disposed to be spaced apart from the housing by a predetermined distance, a second coil disposed to face the first magnet, a printed circuit board on which the second coil is mounted, a plurality of support members, which support the housing such that the housing is movable in second and/or third directions and which connect at least one of the upper and lower elastic members to the printed circuit board, and a conductive member for conductively connecting the upper and lower elastic members.

19 Claims, 26 Drawing Sheets

Related U.S. Application Data continuation of application No. 14/942,297, filed on Nov. 16, 2015, now Pat. No. 10,042,178.

(51) Int. Cl.

| | | |
|---|---|---|
| *G03B 5/02* | (2021.01) | |
| *G03B 5/04* | (2021.01) | |
| *H01F 7/20* | (2006.01) | |
| *H01F 27/28* | (2006.01) | |
| *H01F 27/32* | (2006.01) | |

(52) U.S. Cl.
 CPC ............ *H01F 7/20* (2013.01); *H01F 27/2804* (2013.01); *H01F 27/325* (2013.01)

(58) Field of Classification Search
 CPC .... G03B 5/02; G03B 5/04; G03B 2205/0007; H01F 7/20; H01F 27/2804; H01F 27/325
 USPC ........................................................ 359/557
 See application file for complete search history.

(56) References Cited

U.S. PATENT DOCUMENTS

| | | | |
|---|---|---|---|
| 2013/0050828 | A1 | 2/2013 | Sato et al. |
| 2013/0107068 | A1 | 5/2013 | Kim et al. |
| 2013/0107112 | A1 | 5/2013 | Oh |
| 2013/0136438 | A1 | 5/2013 | Lee et al. |
| 2014/0192260 | A1 | 7/2014 | Oh |
| 2014/0327965 | A1* | 11/2014 | Chen .................. H04N 23/687 359/557 |
| 2015/0261067 | A1 | 9/2015 | Jung et al. |
| 2016/0109681 | A1* | 4/2016 | Lam ..................... G02B 7/28 359/824 |
| 2016/0109721 | A1* | 4/2016 | Min ..................... H04N 23/55 359/557 |
| 2016/0209621 | A1 | 7/2016 | Park et al. |
| 2016/0223830 | A1 | 8/2016 | Oh |
| 2016/0341927 | A1 | 11/2016 | Chen et al. |
| 2017/0254979 | A1* | 9/2017 | Bai .................... H04M 1/0264 |

FOREIGN PATENT DOCUMENTS

| | | | |
|---|---|---|---|
| CN | 102955324 | A | 3/2013 |
| CN | 103095974 | A | 5/2013 |
| CN | 203054325 | U | 7/2013 |
| CN | 203275847 | U | 11/2013 |
| CN | 104142553 | A | 11/2014 |
| CN | 204009314 | U | 12/2014 |
| EP | 2 921 892 | A2 | 9/2015 |
| JP | 61-502648 | A | 11/1986 |
| JP | H07-73488 | A | 3/1995 |
| JP | H09-230226 | A | 9/1997 |
| JP | 2001-305598 | A | 10/2001 |
| JP | 2002-063724 | A | 2/2002 |
| JP | 2010-134375 | A | 6/2010 |
| JP | 2011-65140 | A | 3/2011 |
| JP | 2011-203283 | A | 10/2011 |
| JP | 2012-197325 | A | 10/2012 |
| JP | 2013-24944 | A | 2/2013 |
| JP | 2013-120248 | A | 6/2013 |
| JP | 2013-210550 | A | 10/2013 |
| JP | 2014-126668 | A | 7/2014 |
| JP | 2014-219675 | A | 11/2014 |
| JP | 2016-20939 | A | 2/2016 |
| KR | 10-2012-0027751 | A | 3/2012 |
| KR | 10-2013-0050626 | A | 5/2013 |
| KR | 10-2014-0084971 | A | 7/2014 |
| TW | 2013-17654 | A1 | 5/2013 |
| WO | 2013/027927 | A2 | 2/2013 |

OTHER PUBLICATIONS

Office Action dated Jul. 8, 2021 in Japanese Application No. 2020-122127.
Office Action dated Mar. 29, 2021 in Korean Application No. 10-2014-0158686.
Notice of Allowance dated Feb. 2, 2021 in Chinese Application No. 201510785707.2, along with its English translation.
European Search Report dated Mar. 16, 2016, in European Application No. 15192898.3.
European Search Report dated Jul. 26, 2018 in European Application No. 18160094.1.
Office Action dated Sep. 6, 2019 in Japanese Application No. 2015-220295.
Office Action dated Jan. 28, 2020 in Japanese Application No. 2015-220295.
Office Action dated Dec. 16, 2019 in U.S. Appl. No. 16/029,182.
Notice of Allowance dated Apr. 29, 2020 in U.S. Appl. No. 16/029,182.
Office Action dated Nov. 17, 2021 in Japanese Application No. 2020-122127.
Office Action dated May 10, 2023 in European Application No. 18 160 094.

* cited by examiner

150 : 150-1, 150-2, 150-3, 150-4, 150-5, 150-6,
160 : 160-1, 160-2
220 : 220-1, 220-2
400 : 400-1, 400-2

LENS MOVING APPARATUS

CROSS-REFERENCE TO RELATED APPLICATIONS

This application is a continuation of U.S. patent application Ser. No. 16/029,182, filed Jul. 6, 2018; which is a continuation of U.S. patent application Ser. No. 14/942,297, filed Nov. 16, 2015, now U.S. Pat. No. 10,042,178, issued Aug. 7, 2018; which claims priority to Korean Patent Application Nos. 10-2014-0158683, filed Nov. 14, 2014; and 10-2014-0158686, filed Nov. 14, 2014, the disclosures of each of which are incorporated herein by reference in their entirety.

TECHNICAL FIELD

Embodiments relate to a lens moving apparatus.

BACKGROUND

It is difficult to adopt voice coil motor (VCM) technology, which is typically used in conventional camera modules, for use in an ultracompact camera module, which aims at achieving low power consumption, and thus research into the technology has been actively undertaken.

A camera module mounted in a small-sized electronic product, such as a smart phone, may be frequently subjected to shocks during use. In addition, the camera module may minutely shake due to the trembling of the user's hand while taking a photograph. Therefore, there is a high necessity for a technology capable of incorporating an optical image stabilizer into the camera module.

Various handshake correction technologies have been recently researched. In such handshake correction, there is the need to reduce the driving force required for handshake correction and to increase the durability of the lens moving apparatus and the camera module. Among such handshake correction technologies, there is a technology of correcting handshake by moving an optical module in the x-axis and y-axis directions, which define a plane perpendicular to the optical axis. The technology is required to accurately and rapidly move the optical system in the plane perpendicular to the optical axis for image correction.

BRIEF SUMMARY

Embodiments provide a lens moving apparatus, which is able to reduce driving force for handshake correction and to increase durability, and a camera module including the same.

Furthermore, embodiments provide a lens moving apparatus, which has a simplified structure and enables accurate and rapid handshake correction, and a camera module including the same.

In one embodiment, a lens moving apparatus includes a bobbin including a first coil, a first magnet disposed to face the first coil, a housing for supporting the first magnet, upper and lower elastic members each coupled to both the bobbin and the housing, a base disposed to be spaced apart from the housing, a second coil disposed to face the first magnet, a printed circuit board on which the second coil is mounted, a plurality of support members, which support the housing such that the housing is movable in second and/or third directions and which connect at least one of the upper and lower elastic members to the printed circuit board, and a conductive member for conductively connecting the upper and lower elastic members.

In another embodiment, a lens moving apparatus includes a housing, a bobbin disposed in the housing so as to move in a first direction, upper and lower elastic members each coupled to both the housing and the bobbin, a printed circuit board conductively connected to at least one of the upper and lower elastic members, and at least one support member, which supports the housing such that the housing is movable with respect to the base in second and/or third directions and which conductively connects at least one of the upper and lower elastic members to the printed circuit board, the at least one support member being integrated with two conductive wires.

In a further embodiment, a lens moving apparatus includes a housing, a bobbin disposed in the housing so as to move in a first direction, upper and lower elastic members each coupled to both the housing and the bobbin, a printed circuit board conductively connected to at least one of the upper and lower elastic members, and at least one support member, which supports the housing such that the housing is movable in second and/or third directions and which conductively connects at least one of the upper and lower elastic members to the printed circuit board, the at least one support member being integrated with at least two conductive wires, wherein the at least one support member includes an electrical insulating coating member, which sheathes the two conductive wires and which includes a projecting insulator protruding from an end thereof, the projecting insulator being positioned between the two conductive wires such that adjacent upper elastic members are spaced apart from each other and are thus conductively isolated from each other.

BRIEF DESCRIPTION OF THE DRAWINGS

Arrangements and embodiments may be described in detail with reference to the following drawings, in which like reference numerals refer to like elements and wherein.

DETAILED DESCRIPTION

Figure 1:
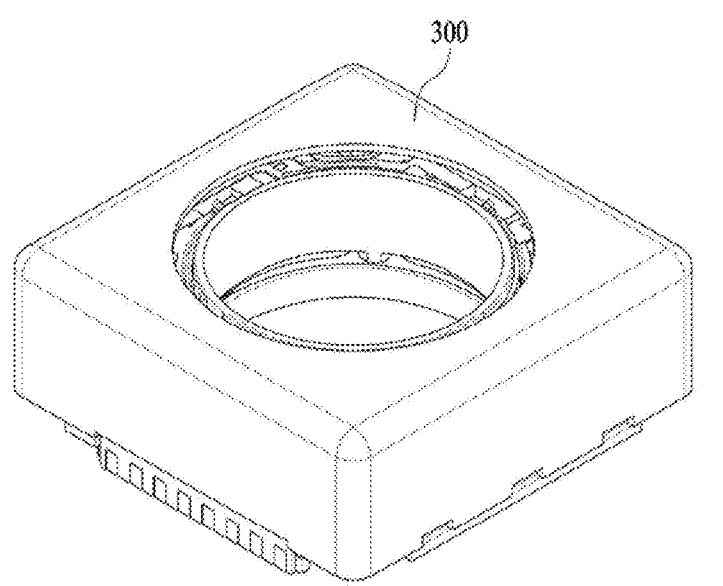
FIG. 1 is a schematic perspective view showing a lens moving apparatus according to a first embodiment.

Hereinafter, embodiments will be described with reference to the attached drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not always shown in proportion.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

A handshake correction apparatus, which is applied to compact camera modules of mobile devices such as smart phones or tablet PCs, refers to an apparatus configured to inhibit the contour of an image captured when taking a still image from not being clearly formed due to vibrations caused by the trembling of the user's hand.

In addition, an autofocusing apparatus is configured to automatically focus the subject image on the surface of an image sensor. The handshake correction apparatus and the autofocusing apparatus may be configured in various manners. The lens moving apparatus according to the embodiments may perform the handshake correction and/or autofocusing operations in such a manner as to move an optical module, composed of a plurality of lenses, in a first direction perpendicular to the optical axis or in a plane defined by the second and third directions, which are perpendicular to the first direction.

The second or third direction may include not only the x-axis direction or the y-axis direction but also a direction which is substantially close to the x-axis direction or the y-axis direction. In other words, in terms of driving in the embodiments, although a housing 140 may move in a direction parallel to the x-axis or the y-axis, the housing may move in a direction which is slightly inclined with respect to the x-axis or the y-axis in the state of being supported by a support member 220.

First Embodiment

Figure 2:
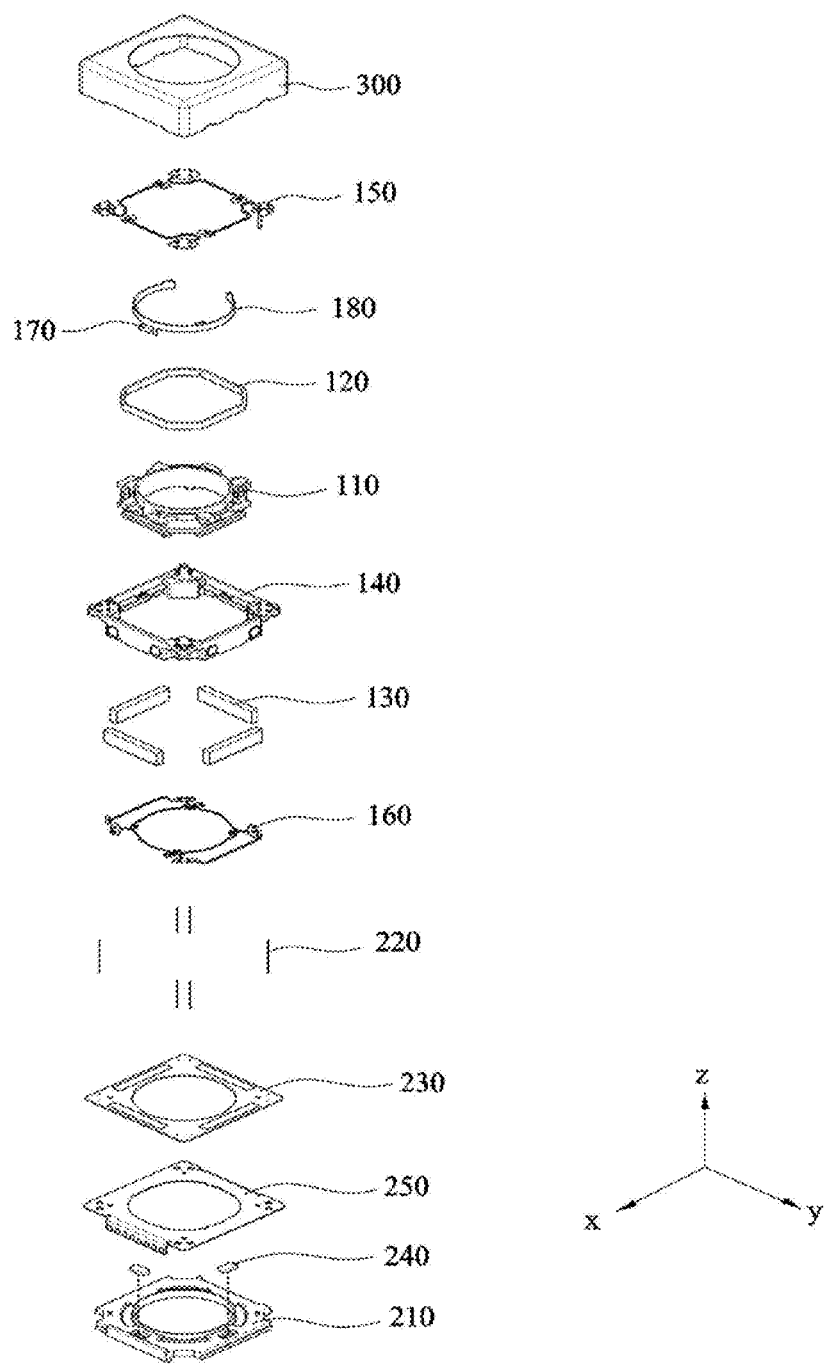
FIG. 2 is an exploded perspective view showing the lens moving apparatus according to the embodiment.

FIG. 1 is a schematic perspective view showing a lens moving apparatus according to a first embodiment. FIG. 2 is an exploded perspective view of the lens moving apparatus shown in FIG. 1.

Referring to FIGS. 1 and 2, the lens moving apparatus according to the embodiment may include a first lens moving unit, a second lens moving unit, and a cover member 300.

The first lens moving unit may serve as the above-mentioned autofocusing apparatus. In other words, the first lens moving unit may serve to move a bobbin 110 in the first direction by virtue of the interaction between a magnet 130 and a first coil 120.

The second lens moving unit may serve as the handshake correction apparatus. In other words, the second lens moving unit may serve to move all or a portion of the first lens moving unit in the second and/or third directions by virtue of the interaction between the magnet 130 and the second coil 230.

The cover member 300 may be configured to have an approximate box shape so as to accommodate the first and second lens moving units therein.

Figure 3:
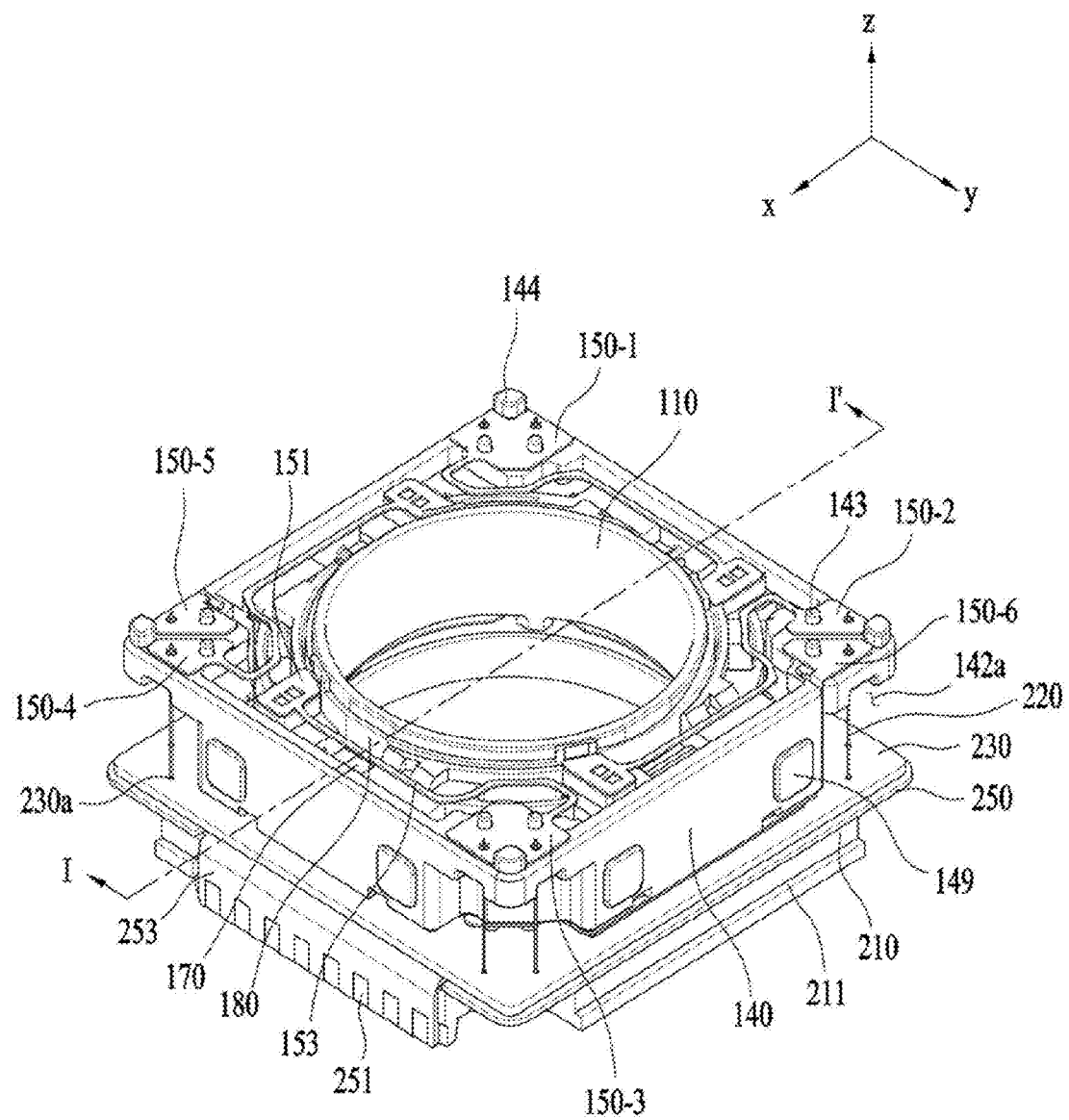
FIG. 3 is a perspective view showing a housing according to the embodiment, from which a cover member is removed.

FIG. 3 is a perspective view showing the lens moving apparatus according to the embodiment, from which the cover member 300 shown in FIG. 1 is removed.

The first lens moving unit may include the bobbin 110, the first coil 120, the magnet 130, a housing 140, an upper elastic member 150, a lower elastic member 160, a first sensor 170 and a sensor substrate 180.

Figure 4:
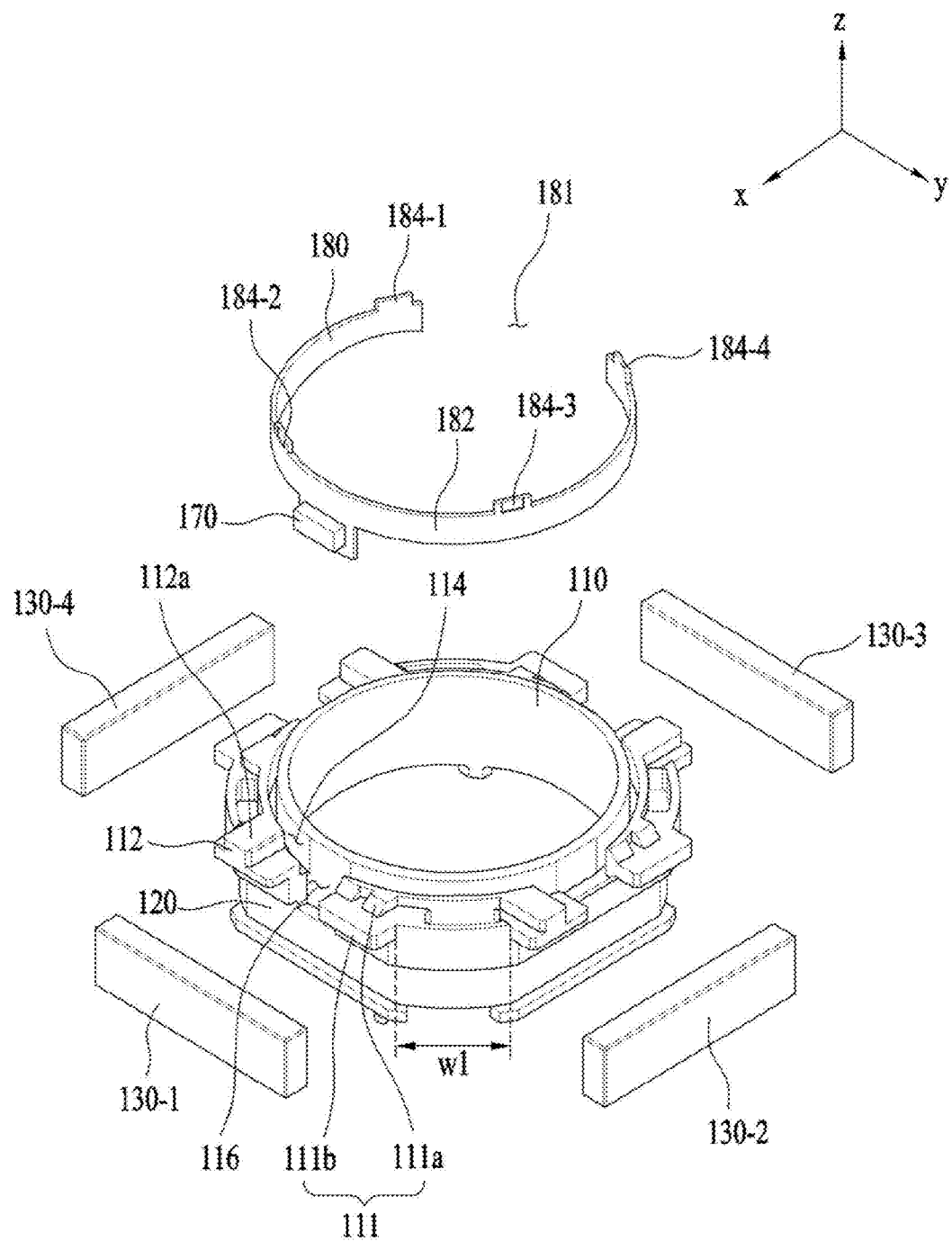
FIG. 4 is an exploded perspective view of the lens moving apparatus according to the embodiment, which shows the bobbin, the first coil, the magnet, the first sensor and the sensor substrate.

FIG. 4 is an exploded perspective view of the lens moving apparatus according to the embodiment, which shows the bobbin 110, the first coil 120, the magnet 130 (130-1, 130-2, 130-3 and 130-4), the first sensor 170 and the sensor substrate 180.

Figure 5A:
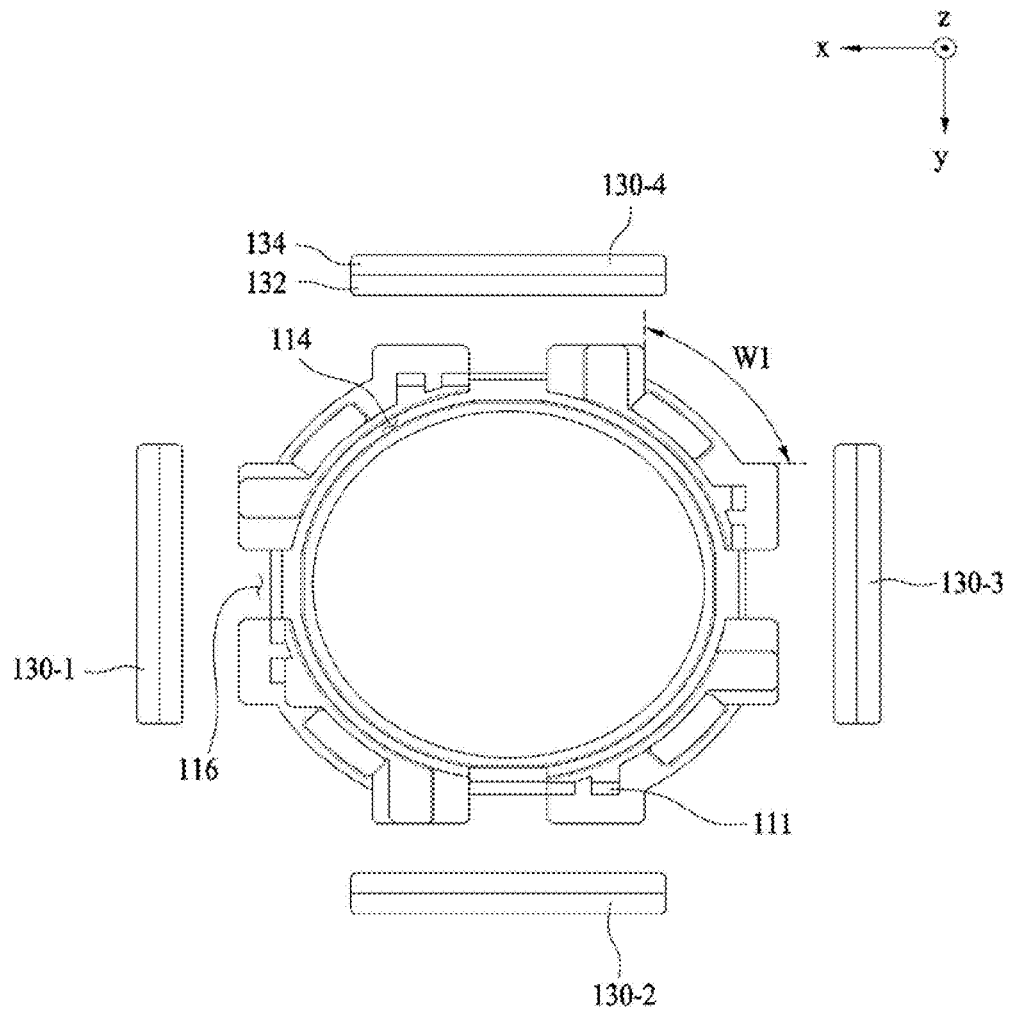
FIG. 5A is a plan view showing the bobbin and the magnet shown in FIG. 4.
Figure 5B:
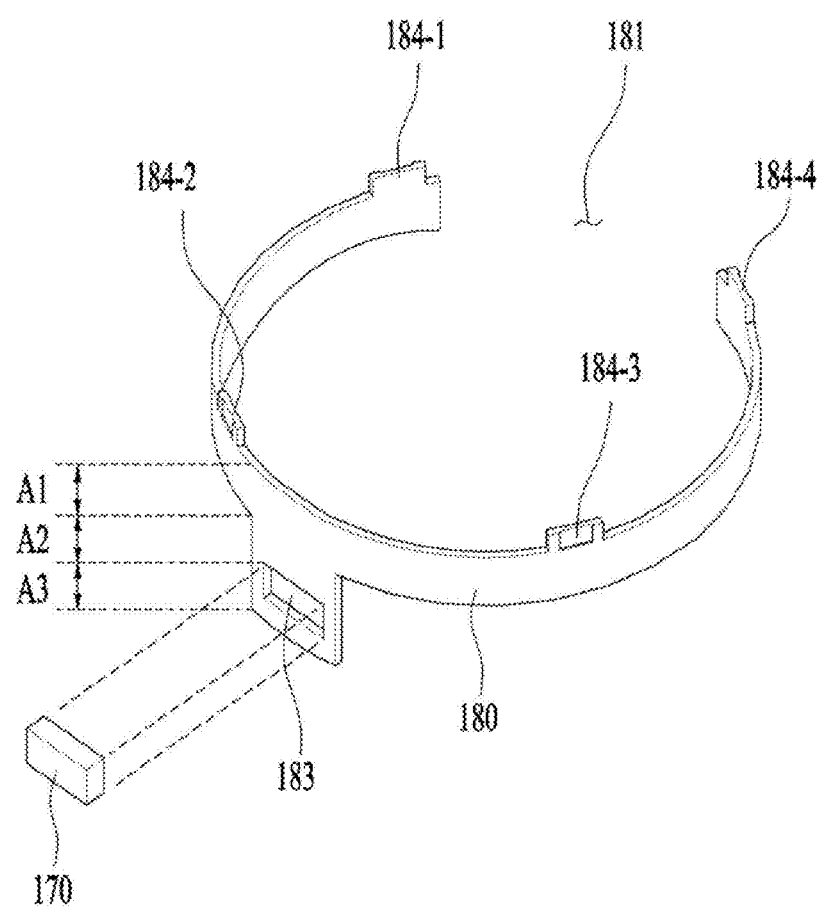
FIG. 5B is a perspective view showing another embodiment of the sensor substrate shown in FIG. 4.
Figure 5C:
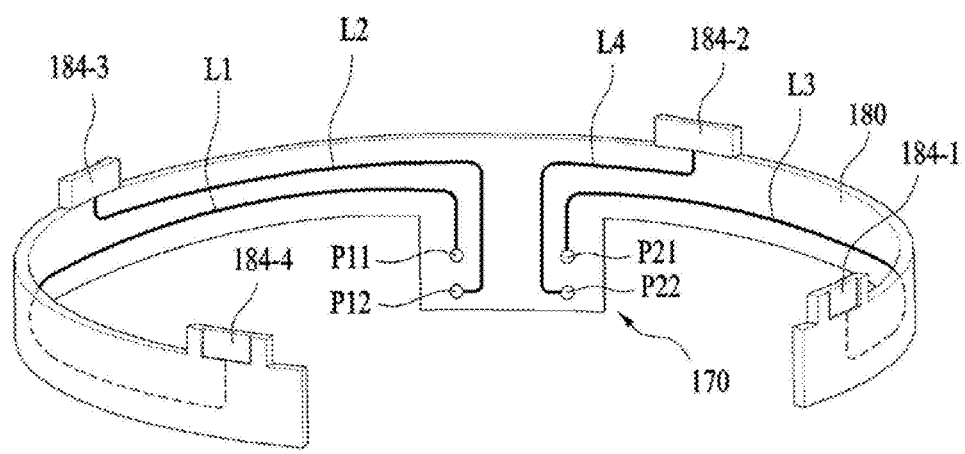
FIG. 5C is a rear perspective view showing one embodiment of the first sensor and the sensor substrate shown in FIG. 4.

FIG. 5A is a plan view showing the bobbin 110 and the magnet 130 (130-1, 130-2, 130-3 and 130-4) shown in FIG. 4. FIG. 5B is a perspective view showing another embodiment of the sensor substrate 180 shown in FIG. 4. FIG. 5C is a rear perspective view showing one embodiment of the first sensor 170 and the sensor substrate 180 shown in FIG. 4.

Referring to the above-mentioned drawings, the bobbin 110 may be disposed in the internal space defined in the housing 140 so as to reciprocate in the first direction, which is the optical axis direction, or in a direction parallel to the first direction. As shown in FIG. 4, the bobbin 110 may be provided therearound with the first coil 120 such that the first coil 120 and the magnet 130 interact with each other in an electromagnetic manner. To this end, the magnet 130 may be disposed around the bobbin 110 so as to face the first coil 120.

When the bobbin 110 performs the upward and/or downward movements in the first direction, which is the optical axis direction, or in a direction parallel to the first direction to fulfill the autofocusing function, the bobbin 110 may be elastically supported by means of the upper and lower elastic members 150 and 160. To this end, the upper and lower elastic members 150 and 160 may be coupled to the bobbin 110 and the housing 140, as will be described later.

Although not shown in the drawings, the lens moving apparatus may include a lens barrel (not shown), which is provided on the inner side surface (i.e. the inner surface) of the bobbin 110 and on which at least one lens is mounted. The lens barrel may be mounted on the inner surface of the bobbin 110 in various ways. For example, the lens barrel may be directly secured to the interior of the bobbin 110, or a single lens may be integrally formed with the bobbin 110 without using the lens barrel. The lens mounted on the lens barrel may include a single lens, or may include two or more lenses, which constitute an optical system.

According to another embodiment, although not shown in the drawings, the bobbin 110 may be provided on the inner circumferential surface thereof with a female threaded portion and on the outer circumferential surface thereof with a male threaded portion corresponding to the female threaded portion such that the lens barrel is coupled to the bobbin 110 by virtue of threaded engagement between the female and male threaded portions. However, the embodiments are not limited thereto.

The bobbin 110 may include first and second protrusions 111 and 112.

The first protrusion 111 may include a guide portion 111a and a first stopper 111b. The guide portion 111a may serve to guide the installation of the upper elastic member 150 at a predetermined position. For example, the guide portion 111a may guide the passage of a first frame connector 153 of the upper elastic member 150, as shown in FIG. 3. To this end, according to the embodiment, a plurality of guide portions 111a may protrude in the second and third directions, which are perpendicular to the first direction. The guide portions 111a may be provided in a plane defined by the x axis and the y axis so as to be symmetrical about the center point of the bobbin 110, as shown in the drawings, or may be provided so as to be asymmetrical about the center point of the bobbin 110 without interference with other components, unlike the embodiment shown in the drawings.

The second protrusion 112 may include a plurality of second protrusions, which protrude in the second and third directions, which are perpendicular to the first direction. A first inner frame 151 of the upper elastic member 150, which will be described later, may be mounted on the upper surfaces 112a of the second protrusions 112.

Figure 6:
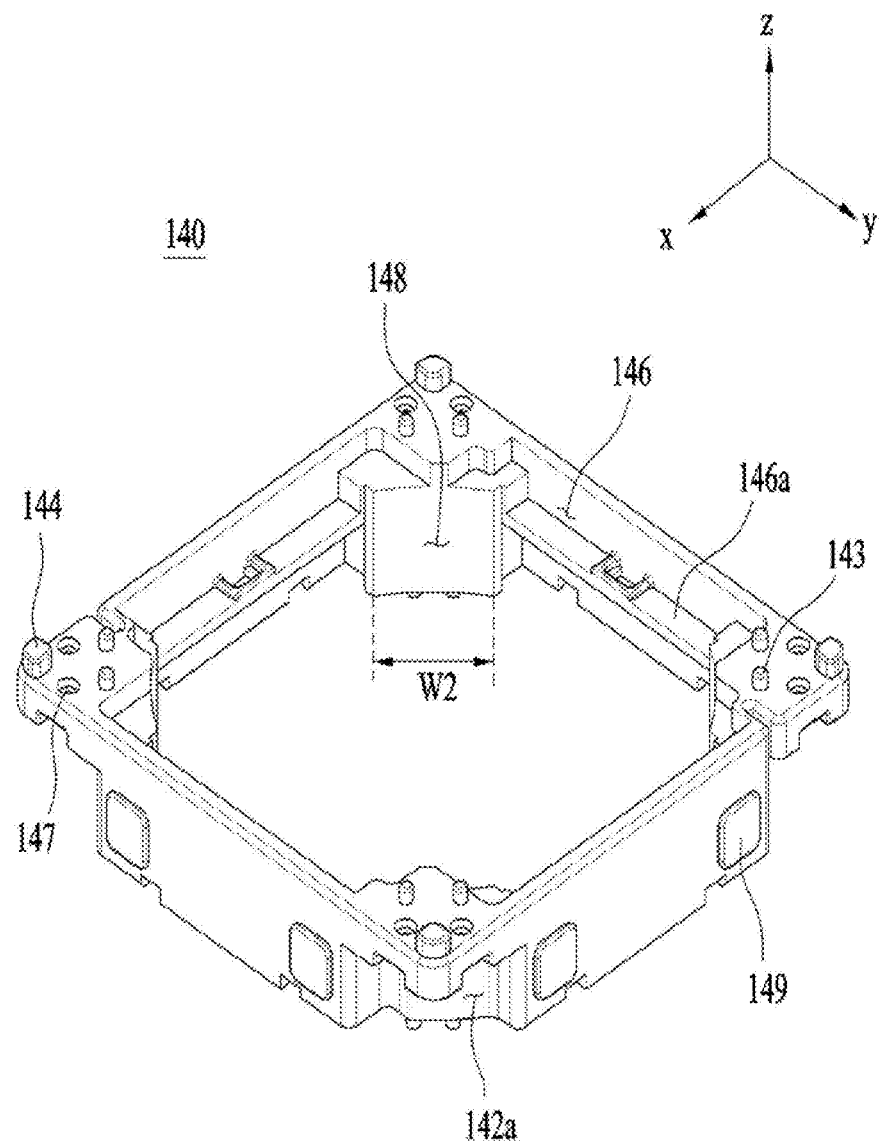
FIG. 6 is a top perspective view of the housing according to the embodiment.
Figure 7:
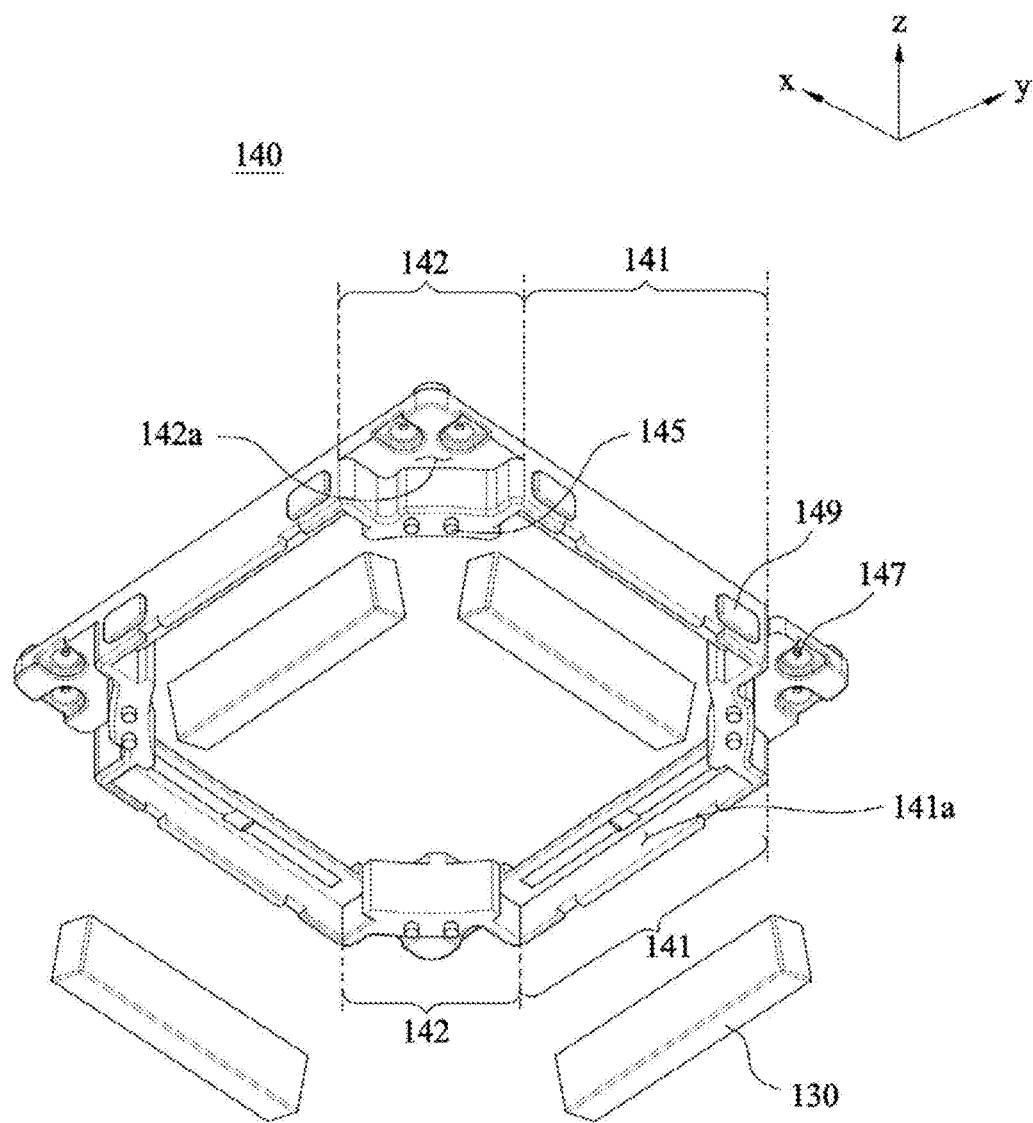
FIG. 7 is a bottom exploded perspective view of the housing and the magnet according to the embodiment.

FIG. 6 is a top perspective view of the housing 140 according to the embodiment. FIG. 7 is a bottom exploded perspective view of the housing 140 and the magnet 130 according to the embodiment.

Referring to FIG. 6, the housing 140 may include first mounting recesses 146, which are formed at positions corresponding to those of the first and second protrusions 111 and 112. When the bobbin 110 moves in the first direction, which is the optical axis direction, or in a direction parallel to the first direction for the autofocusing function, the first stoppers 111b of the first protrusions 111 and the second protrusions 112 serve to inhibit the bottom surface of the body of the bobbin 110 from directly colliding with the upper surfaces of a base 210 and a printed circuit board 250 even when the bobbin 110 moves beyond a predetermined range due to external impacts or the like. To this end, the first stoppers 111b may protrude from the outer circumferential surface of the bobbin 110 in a radial direction, that is, in the second or third direction, so as to be longer than the guide portions 111a, and the second protrusions 112 may also protrude in the lateral direction so as to be larger than the upper surfaces thereof on which the upper elastic member 150 is mounted.

Referring to FIG. 6, when the state in which the bottom surfaces of the first and second protrusions 111 and 112 are in contact with the bottom surfaces of the first mounting recesses 146 is set be the initial position, the autofocusing function may be controlled as in the unidirectional control of a conventional voice coil motor (VCM). Specifically, the autofocusing function may be fulfilled in such a manner that the bobbin 110 is raised when current is supplied to the first coil 120 and is lowered when the supply of current is interrupted.

However, when the state in which the bottom surfaces of the first and second protrusions 111 and 112 are spaced apart from the bottom surfaces of the first mounting recesses 146 by a predetermined distance is set to be the initial position, the autofocusing function may be controlled in accordance with the direction of current, as in the bidirectional control of a conventional voice coil motor. Specifically, the autofocusing function may be fulfilled by moving the bobbin 110 upward or downward. For example, the bobbin 110 may be moved upward upon the application of forward current and may be moved downward upon the application of reverse current.

The housing 140 may include third protrusions 148, which are provided at positions corresponding to spaces each having a first width W1, which are defined between the first and second protrusions 111 and 112. The surfaces of the third protrusions 148 that face the bobbin 110 may have the same shape as the side surface of the bobbin 110. At this point, the first width W1 between the first and second protrusions 111 and 112, shown in FIG. 4, and the second width W2 between the third protrusions 148, shown in FIG. 6 may be set to have a predetermined tolerance therebetween. Accordingly, the displacement of the third protrusions 148 between the first and second protrusions 111 and 112 may be restricted. As a result, even if the bobbin 110 is subjected to a force tending to rotate the bobbin 110 about the optical axis rather than a force tending to move the bobbin 110 in the optical axis direction, it is possible to inhibit the rotation of the bobbin 110 by means of the third protrusions 148.

According to the embodiment, the first sensor 170 may be disposed, coupled or mounted on the bobbin 110, and may thus be moved together with the bobbin 110. The first sensor 170 may detect displacement of the bobbin 110 in the first direction, which is the optical axis direction, and may output the result of the detection as a feedback signal. By using the result of the detection which is obtained by detecting displacement of the bobbin 110 in the first direction or in a direction parallel to the first direction using the feedback signal, displacement of the bobbin 110 in the first direction or a direction parallel to the first direction may be adjusted.

The first sensor 170 may be disposed, coupled or mounted on the housing 140 in various manners, and may receive current in various fashions depending on the manner in which the first sensor 170 is disposed, coupled or mounted.

According to one embodiment, the first sensor 170 may be coupled to the housing 140, and an additional magnet (not shown), which faces the first sensor 170, may be disposed on the bobbin 110. The first sensor 170 may be disposed, coupled or mounted on side surfaces or corners of the first mounting recess 146 of the housing 140 shown in FIG. 6 (for example, the surface of the third protrusion 148). In this case, by the magnetic force which is exerted on the magnet 130 from the additional sensor magnet, the bobbin 110, which is moved in the first direction, that is, the optical axis direction, or a direction parallel to the first direction, may be tilted, and the accuracy of the feedback signal may be deteriorated. In consideration of this, another additional sensor magnet may be disposed, coupled or mounted on the bobbin 110 at a position at which the interaction between the first additional sensor magnet and the magnet 130 is minimized.

According to another embodiment, the first sensor 170 may be directly disposed, coupled or mounted on the outer circumferential surface of the bobbin 110. In this case, surface electrodes (not shown) may be provided on the outer circumferential surface of the bobbin 110, and the first sensor 170 may receive current through the surface electrodes.

According to a further embodiment, the first sensor 170 may be indirectly disposed, coupled or mounted on the bobbin 110, as shown in the drawings. For example, the first sensor 170 may be disposed, coupled or mounted on the sensor substrate 180, and the sensor substrate 180 may be coupled to the bobbin 110. In other words, the first sensor 170 may be indirectly disposed, coupled or mounted on the bobbin 110 through the sensor substrate 180.

When the first sensor 170 is directly or indirectly disposed on the bobbin 110, as in the other and further embodiments, the sensor magnet may be disposed independently from the magnet 130, and the magnet 130 may be used as the sensor magnet.

Hereinafter, although the case in which the first sensor 170 is indirectly disposed, coupled or mounted on the bobbin 110 through the sensor substrate 180 and the magnet 130 is used as the sensor magnet will be described, the embodiments are not limited thereto.

Referring to FIGS. 4 and 5A, the bobbin 110 may be provided on the outer side surface thereof with a support groove 114, and the sensor substrate 180 may be fitted into the support groove 114 so as to be coupled to the bobbin 110. Although the sensor substrate 180 may have, for example, a ring shape, as shown in the drawings, the embodiments are not limited as to the shape of the sensor substrate 180. The support groove 114 may be defined between the outer circumferential surface of the bobbin 110 and the first and second protrusions 111 and 112. At this point, the first sensor 170 may have a shape capable of being disposed, coupled or mounted on the sensor substrate 180. As shown in FIGS. 4 and 5B, the first sensor 170 may be disposed, coupled or mounted on, for example, an upper area A1, an intermediate area A2 and a lower area A3 of the outer surface of the sensor substrate 180 in various manners. The first sensor 170 may receive current from the outside through the circuit of the sensor substrate 180. For example, a mounting hole 183 may be formed in the outer surface of the sensor substrate 180, and the first sensor 170 may be disposed, coupled or mounted in the mounting hole 183, as shown in FIG. 5B. At least one surface of the mounting hole 183 may be configured to have an inclined surface (not shown) so as to allow more efficient injection of epoxy or the like for assembly of the first sensor 170. Although additional epoxy or the like may not be injected into the mounting hole 183, the epoxy or the like may be injected so as to increase the disposition stability, coupling force and/or mounting force of the first sensor 170.

Alternatively, the first sensor 170 may be attached to the outer surface of the sensor substrate 180 by means of an adhesive, such as epoxy or double-sided adhesive tape, as shown in FIG. 4. As illustrated in FIG. 4, the first sensor 170 may be disposed, coupled or mounted on the center of the sensor substrate 180.

The bobbin 110 may have a reception recess 116, which is suitable for receiving the first sensor 170, which is disposed, coupled or mounted on the sensor substrate 180. The reception recess 116 may be formed between the first and second protrusions 111 and 112.

The sensor substrate 180 may include a body 182, elastic member contacts 184-1, 184-2, 184-3 and 184-4, and circuit patterns L1, L2, L3 and L4.

When the support groove 114, which is defined between the outer surface of the bobbin 110 and the first and second protrusions 111 and 112, has the same shape as the outer surface of the bobbin 110, the body 182 of the sensor substrate 180 may have a shape capable of being securely fitted into the support groove 114. Although the support groove 114 and the body 182 may have a circular cross-sectional shape, as shown in FIG. 3 to FIG. 5A, the embodiments are not limited thereto. According to another embodiment, the support groove 114 and the body 182 may have a polygonal cross-sectional shape.

The body 812 of the sensor substrate 180 may include a first segment, on the outer surface of which the first sensor 170 is disposed, coupled or mounted, and a second segment, which contacts the first segment and extends therefrom. Although the sensor substrate 180 may have an opening in a region facing the first segment so as to be easily fitted into the support groove 114, the embodiments are not limited to a sensor substrate 180 having any specific shape. The elastic member contacts 184-1, 184-2, 184-3 and 184-4 may protrude from the body 182 in the direction which allows the elastic member contacts 184-1, 184-2, 184-3 and 184-4 to contact the first frame 151, for example, in the first direction, that is, the optical axis direction, or in a direction parallel to the first direction. The elastic member contacts 184-1, 184-2, 184-3 and 184-4 are the portions that are connected to the first inner frame 151 of the upper elastic member 150, which will be described later.

The circuit patterns L1, L2, L3 and L4 may be formed on the body 182, and may conductively connect the first sensor 170 and the elastic member contacts 184-1, 184-2, 184-3 and 184-4. For example, the first sensor 170 may be embodied as a Hall sensor, but may alternatively be embodied as any sensor as long as it is able to detect variation in magnetic force. If the first sensor 170 is embodied as a Hall sensor, the Hall sensor 170 may have a plurality of pins. For example, the plurality of pins may include a first pin and a second pin. Referring to FIG. 5C, the first pin may include, for example, a first of first pin P11 and a second of first pin P12, which are respectively connected to the voltage and to ground, and the second pin may include a first of second pin P21 and a second of second pin P22, which output the result of the detection. At this point, although the result of the detection, that is, the feedback signal which is output through the first of second pin P21 and the second of second pin P22, may be of a current type, the embodiments are not limited as to the kind of feedback signal.

The first of first, second of first, first of second and second of second pins P11, P12, P21 and P22 of the first sensor 170 may be conductively connected to the elastic member contacts 184-1, 184-2, 184-3 and 184-4 through the circuit patterns L1, L2, L3 and L4, respectively. Referring to FIG. 5C, the first of first, second of first, first of second and second of second pins P11, P12, P21 and P22 may be connected to the fourth, third, second and first elastic member contacts 184-1, 184-3, 184-2 and 184-1 through the circuit patterns, that is, the first, second, third and fourth lines L1, L2, L3 and L4, respectively. According to an embodiment, the first, second, third and fourth lines L1, L2, L3 and L4 may be constructed so as to be visible to the naked eye. According to another embodiment, the first, second, third and fourth lines L1, L2, L3 and L4 may be formed in the body 182 so as to be invisible to the naked eye.

Figure 8:
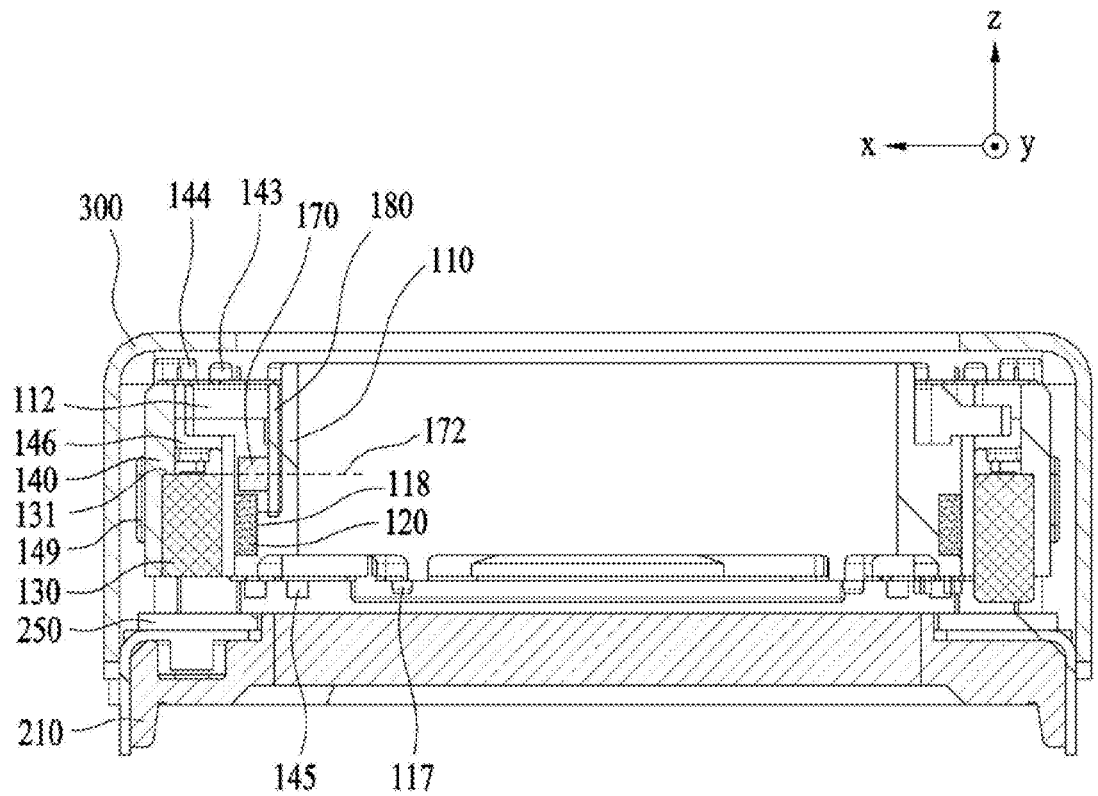
FIG. 8 is a cross-sectional view taken along line I-I' of FIG. 3.

FIG. 8 is a cross-sectional view taken along line I-I' of FIG. 3.

Referring to FIG. 8, the first sensor 170 may be disposed to face the magnet 130 such that the imaginary center horizontal line 172, which extends through the center of the first sensor 170 in the optical axis direction and intersects the optical axis, is aligned with the upper end 131 of the magnet 130.

At this point, although the bobbin 110 may be moved upward and downward in the optical axis direction, that is, in the first direction or in a direction parallel to the first direction with respect to the reference point at which the imaginary center horizontal line 172 coincides with the upper end 131 of the magnet 130, the embodiments are not limited thereto.

Figure 9:
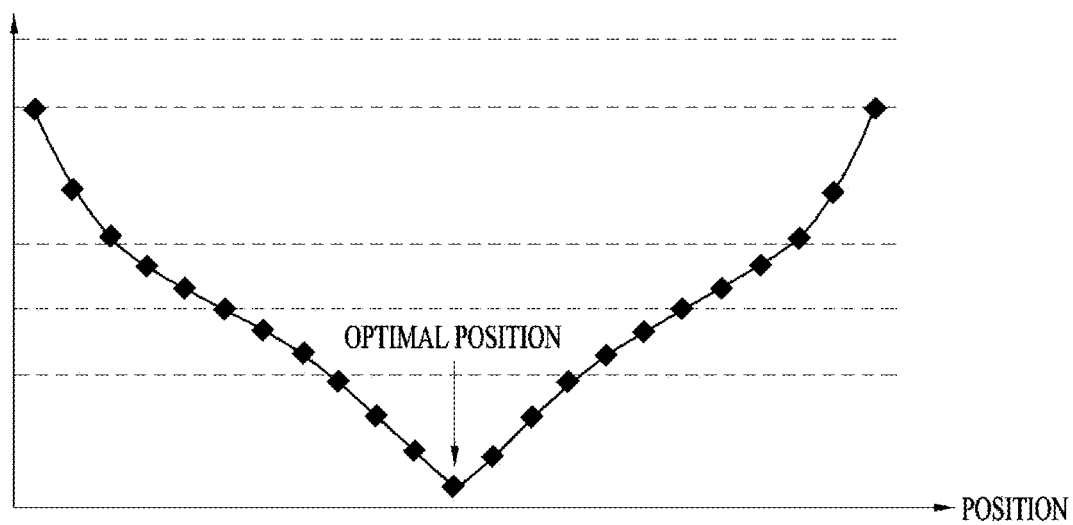
FIG. 9 is a graph illustrating the accuracy of the first sensor as a function of the position of the first sensor.

FIG. 9 is a graph illustrating the accuracy of the first sensor 170 as a function of the position of the first sensor 170, in which the horizontal axis represents the position of the first sensor 170 and the vertical axis represents the accuracy of the first sensor 170.

Referring to FIGS. 8 and 9, it will be appreciated that the efficiency of sensing by the first sensor 170 is maximized when the imaginary center horizontal line 172 coincides with the upper end 131 of the magnet 130.

Figure 10:
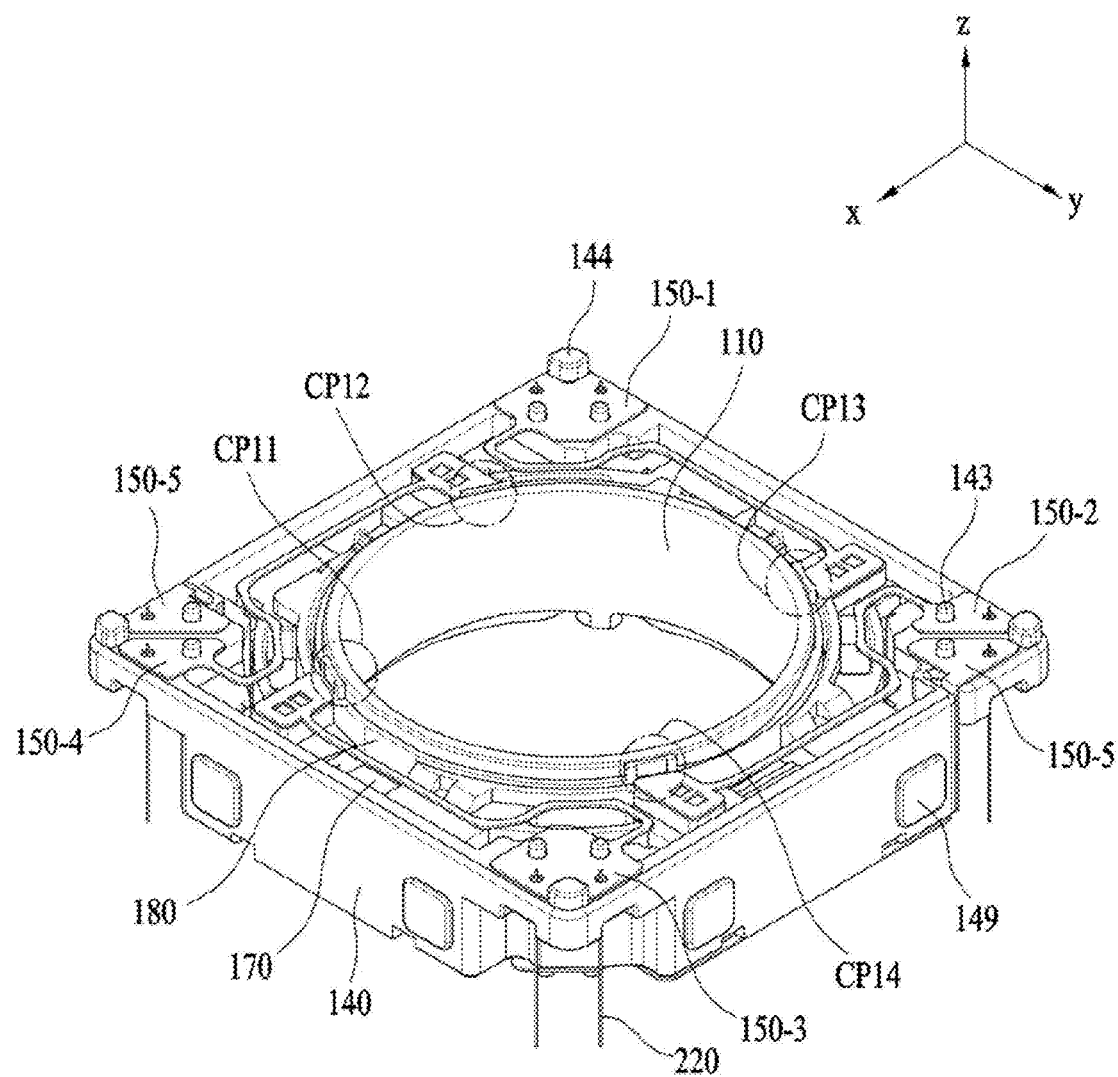
FIG. 10 is a top perspective view of the bobbin, the housing, the upper elastic member, the first sensor, the sensor substrate and a plurality of support members, all of which are coupled to one another.

FIG. 10 is a top perspective view of the bobbin 110, the housing 140, the upper elastic member 150, the first sensor 170, the sensor substrate 180 and a plurality of support members 220, all of which are coupled to one another.

Figure 11:
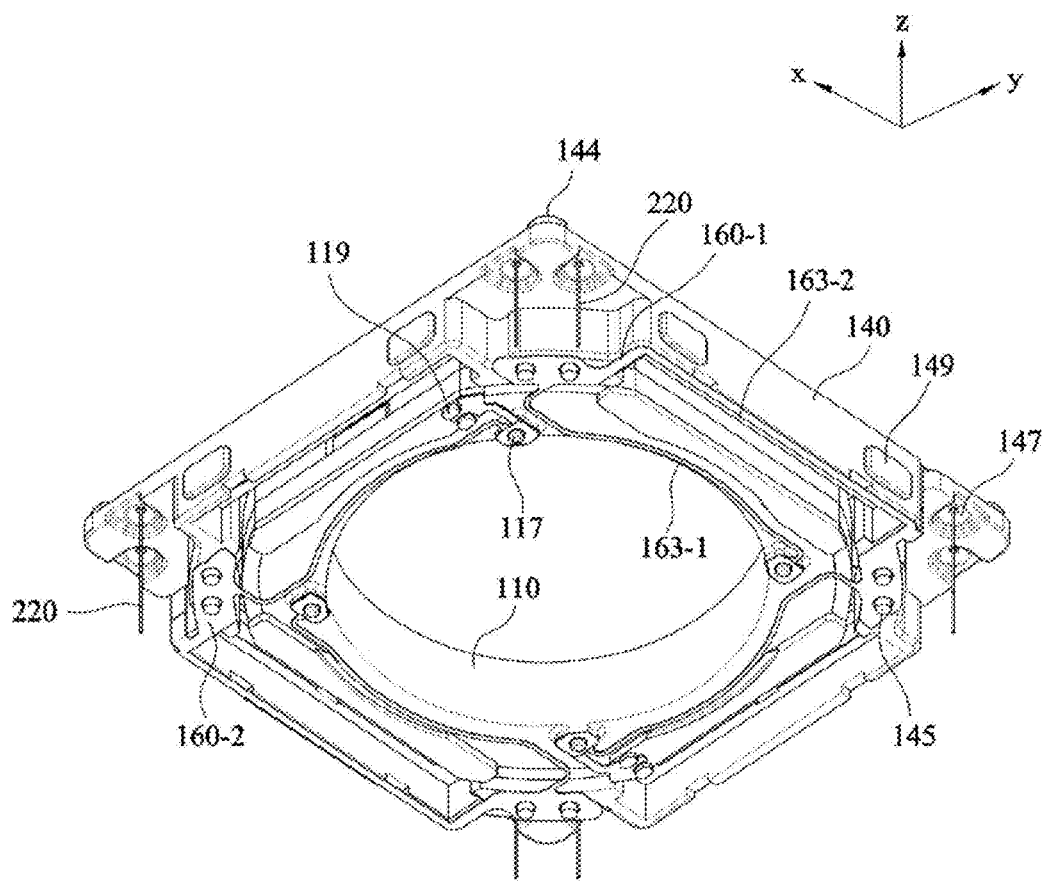
FIG. 11 is a bottom perspective view of the bobbin, the housing, the lower elastic member and the plurality of support members, all of which are coupled to one another.

FIG. 11 is a bottom perspective view of the bobbin 110, the housing 140, the lower elastic member 160 and the plurality of support members 220, all of which are coupled to one another.

The first coil 120 may be wound around the outer circumferential surface of the bobbin 110 by a worker or a machine, and then both ends, that is, the starting line and the ending line of the first coil 120 may be respectively wound around a pair of winding protrusions 119 protruding from the bottom surface of the bobbin 110 in the first direction, and may be secured thereto. At this time, the position of the ending line of the first coil 120, which is wound around the winding protrusion 119, may vary depending on the worker. As illustrated in FIG. 11, although the pair of winding protrusions 119 may be disposed at positions that are symmetrical about the center of the bobbin 110, the embodiments are not limited thereto.

As illustrated in FIG. 8, the first coil 120 may be fitted and coupled in a coil groove 118, which is formed in the outer circumferential surface of the bobbin 110. As illustrated in FIG. 2, although the first coil 120 may be embodied as a polygonal coil block, the embodiments are not limited thereto. According to another embodiment, the first coil 120 may be directly wound around the outer circumferential surface of the bobbin 110, or may be wound through a coil ring (not shown). The coil ring may be coupled to the bobbin 110 in the same manner as the sensor substrate 180 fitted in the support groove 114, and the first coil 120 may be wound around the coil ring rather than being wound or disposed around the bobbin 110. In any case, the starting line and the ending line of the first coil 120 may be respectively wound around the pair of winding protrusions 119 and secured thereto, and other constructions are the same.

As shown in FIG. 2, the first coil 120 may be configured to have an approximately octagonal shape. This is because the outer circumferential surface of the bobbin 110, which corresponds to the first coil 120, has the octagonal shape, as illustrated in FIG. 5A. At least four of the surfaces of the first coil 120 may be configured to be linear, and the corner surfaces connected between the four surfaces may also be configured to be linear. However, the embodiments are not limited thereto, and the surfaces may be configured to be rounded.

The linear surfaces of the first coil 120 may be configured to correspond to the magnets 130. The surfaces of the magnets 130, which correspond to the surfaces of the first coil 120, may have the same radius of curvature as the surfaces of the first coil 120. Specifically, the surfaces of the magnets 130 may be linear when the surfaces of the coils 120 are linear, whereas the surfaces of the magnets 130 may be rounded when the surfaces of the coils 120 are rounded. However, even if the surfaces of the first coil 120 are rounded, the surfaces of the magnets 130 may be linear, and vice versa.

The first coil 120, which is intended to move the bobbin 110 in the first direction, which is parallel to the optical axis, or in a direction parallel to the first direction so as to fulfill the autofocusing function, may generate electromagnetic force through the interaction between the magnets 130 and the first coil 120 upon the supply of current. The generated electromagnetic force may move the bobbin 110 in the first direction or in a direction parallel to the first direction.

The first coil 120 may be configured to correspond to the magnets 130. In other words, if the magnets 130 are constructed to form a single magnet body and the entire inner surface of the magnet 130, which faces the outer surface of the first coil 120, has the same polarity, the outer surface of the first coil 120, which corresponds to the inner surface of the magnet 130, may have the same polarity.

Alternatively, the magnet 130 may be divided into two or four magnets and thus the inner surface of the magnet 130, which faces the outer surface of the first coil 120, may also be divided into two or four surfaces, in which case the first coil 120 may also be divided into a number of coils that corresponds to the number of the divided magnets 130.

The magnet 130 may be disposed at a position corresponding to that of the first coil 120. Referring to FIG. 8, the magnet 130 may be disposed to face the first coil 120 as well as the first sensor 170. This is the case in which the magnet 130 is used as the magnet for the first sensor 170 without providing an additional magnet for the first sensor 170, as in one embodiment. In this case, the magnet 130 may be received in a first side portion 141 of the housing 140, as shown in FIG. 7. The magnet 130 may be configured to have an approximately cuboid shape corresponding to that of the first side portion 141 of the housing 140, and the surface of the magnet 130 that faces the first coil 120 may be configured to have a curvature corresponding to that of the corresponding surface of the first coil 120.

The magnet 130 may be constituted by a single magnet body. Referring to FIG. 5A, which shows the embodiment, the magnet 130 may be oriented such that the inner surface of the magnet 130 that faces the first coil 120 serves as an S pole, whereas the outer surface of the magnet 130 serves as an N pole 134. However, the embodiments are not limited thereto, and the inverted disposition is also possible.

Two or more magnets 130 may be provided. According to the embodiment, four magnets 130 may be provided. As shown in FIG. 5A, the magnet 130 may be configured to have an approximately rectangular shape when viewed in a plan view. Alternatively, the magnet 130 may be configured to have a triangular shape or a rhombus shape.

Although the surface of the magnet 130 that faces the first coil 120 may be linear, the embodiments are not limited thereto. If the corresponding surface of the first coil 120 is rounded, the magnet 130 may be rounded so as to have a curvature corresponding to that of the rounded surface of the first coil 120. By virtue of this configuration, it is possible to maintain a constant distance between the magnet 130 and the first coil 120. In the embodiment, the magnets 130 may be disposed one at each of the four first side portions 141 of the housing 140. However, the embodiments are not limited thereto. In some designs, only one of the surface of the magnet 130 and the surface of the first coil 120 may be a flat surface, whereas the other surface may be a curved surface. Furthermore, both the mating surfaces of the first coil 120 and the magnet 130 may be curved surfaces. In this case, the mating faces of the first coil 120 and the magnet 130 may have the same curvature.

When the magnets 130 have a rectangular shape when viewed in a plan view, as illustrated in FIG. 5A, a pair of magnets 130 among the plurality of magnets 130 may be oriented parallel to each other in the second direction, and the other pair of magnets 130 may be oriented parallel to each other in the third direction. By virtue of this configuration, it is possible to control the movement of the housing 140 for handshake correction.

The housing 140 may have a polygonal shape when viewed in a plan view. Although the outer contour of the upper end of the housing 140 may have a square shape, as shown in FIG. 6, which shows the embodiment, the inner contour of the lower end of the housing 140 may have an octagonal shape, as shown in FIGS. 6 and 7. Accordingly, the housing 140 may include a plurality of side portions, for example, four first side portions 141 and four second side portions 142.

The first side portions 141 may be the portions on which the magnets 130 are mounted, and the second side portions 142 may be the portions on which the support members 220 are mounted. The first side portions 141 may connect the second side portions 142 to each other, and may include flat surfaces having a predetermined depth.

According to the embodiment, the first side portions 141 may be configured to have a surface area equal to or larger than that of the magnets 130. Referring to FIG. 7, the magnets 130 may be held in magnet mounting portions 141a, which are formed at lower portions of inner surfaces of the first side portions 141. The magnet mounting portions 141a may be embodied as recesses having a size corresponding to that of the magnets 130, and may be disposed so as to face at least three surfaces, that is, opposite lateral side surfaces and the upper surface of the magnets 130. The magnet mounting portions 141a may have openings, which are provided in the bottom surfaces thereof and which face the second coil 230, such that the bottom surfaces of the magnets 130 directly face the second coil 230.

Although the magnets 130 may be secured to the magnet mounting portions 141a using an adhesive, an adhesive member such as a piece of double-sided adhesive tape may alternatively be used without limitation. Alternatively, the magnet mounting portions 141a may be embodied as magnet mounting holes into which the magnets 130 are partially fitted or through which the magnets 130 are partially exposed, unlike the recessed structure shown in FIG. 7.

The first side portions 141 may be disposed parallel to the side surfaces of the cover member 300. The first side portions 141 may be configured to have a larger area than the second side portions 142. The second side portions 142 may define passages through which the support members extend. Upper portions of the second side portions 142 may include first through holes 147. The support members 220 may extend through the first through holes 147 and may be connected to the upper elastic member 150.

The housing 140 may further include second stoppers 144. The second stoppers 144 may inhibit the upper surface of the housing 140 from directly colliding with the inner surface of the cover member 300 shown in FIG. 1.

The housing 140 may further include a plurality of first upper support protrusions 143 formed on the second side portions 142. The plurality of first upper support protrusions 143 may have a hemispherical shape, as shown in the drawings, or may have a circular cylindrical shape or a rectangular column shape. However, the embodiments are not limited as to the shape of the first upper support protrusions 143.

Referring to FIGS. 6 and 7, the housing 140 may be provided with first recesses 142a formed in the side portions 142. The first recesses 142a are provided so as to provide paths, through which the support members 220 extend, as well as spaces which will be filled with a damping material. In other words, the first recesses 142a may be filled with damping material. The damping material may be constituted by photo-curable resin. The damping material may be preferably constituted by ultraviolet-curable resin, and may be more preferably constituted by ultraviolet-curable silicone. The damping material may be a gel-type material.

Figure 12:
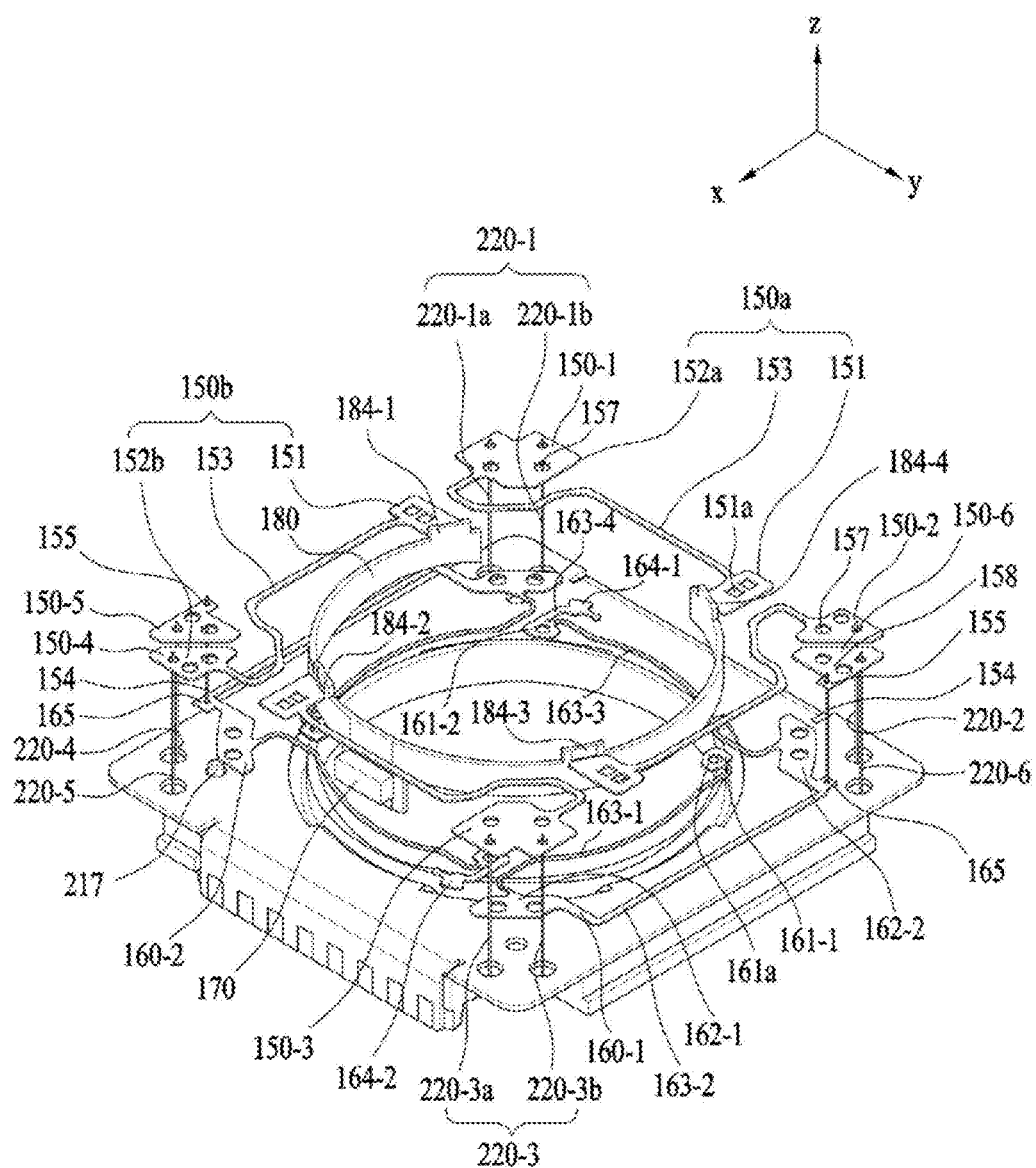
FIG. 12 is a perspective of the upper elastic member, the lower elastic member, the support members, conductive members and the printed circuit board according to the embodiment, all of which are assembled to one another.

FIG. 12 is a perspective of the upper elastic member 150, the lower elastic member 160, the support members 220, the conductive members 154 and the printed circuit board 250 according to the embodiment, all of which are assembled to one another.

In this embodiment, the lower elastic member 160 may be constructed into a dual partitioning structure for applying power to the first coil 120, and the upper elastic member 150 may be a four-segmented structure for outputting a feedback signal from the first sensor 170 and applying power to the first sensor 170.

In the embodiment, the first coil 120 may be conductively connected to the upper elastic member 150, the lower elastic member 160 and the printed circuit board 250 so as to receive power from the printed circuit board 250. The specific structure for implementing this is as follows.

According to the embodiment, the upper elastic member 150 may include at least four upper elastic members, that is, first to fourth upper elastic members 150-1, 150-2, 150-3 and 150-4. The elastic member contacts 184-1, 184-2, 184-3 and 184-4, which are connected to the first sensor 170, may be connected to the plurality of support members 220 through the first to fourth upper elastic members 150-1, 150-2, 150-3 and 150-4. Specifically, the first upper elastic member 150-1, which is connected to the elastic member contact 184-4, may be connected to a first support member 220-1, that is, first of first and second of first support members 220-1a and 220-1b, and the second upper elastic member 150-2, which is connected to the elastic member contact 184-3, may be connected to a second support member 220-2. Furthermore, the third upper elastic member 150-3, which is connected to the elastic member contact 184-2, may be connected to a third support member 220-3, that is, first of third and second of third support members 220-3a and 220-3b, and the fourth upper elastic member 150-4, which is connected to the elastic member contact 184-1, may be connected to a fourth support member 220-4.

Each 150a of the first and third upper elastic members 150-1 and 150-3 may include the first inner frame 151, a first of first outer frame 152a and the first frame connector 153, and each 150b of the second and fourth upper elastic members 150-2 and 150-4 may include the first inner frame 151, a first of first outer frame 152b and the first frame connector 153. The first inner frame 151 may be coupled to the bobbin 110 and the associated elastic member contacts 184-1, 184-2, 184-3 and 184-4. As shown in FIG. 4, when the upper surface 112a of the second protrusion 112 is flat, the first inner frame 151 may be placed on the upper surface 112a, and may be secured thereto by means of an adhesive member. According to another embodiment, when a support protrusion (not shown) is formed on the upper surface 112a, unlike the one embodiment shown in FIG. 4, the support protrusion may be inserted into a first of second through hole 151a formed in the first inner frame 151, and may be secured thereto through thermal fusion or by means of an adhesive such as epoxy.

The first of first outer frames 152a and 152b may be coupled to the housing 140, and may be connected to the support members 220. The first frame connector 153 may connect the first inner frame 151 and the first of first outer frame 152a and 152b. Although the first of first outer frame 152b has a configuration in which the first of first outer frame 152a is divided into two segments, the embodiments are not limited thereto. In other words, according to another embodiment, the first of first outer frame 152a may also be divided into two segments in the same manner as the first of first outer frame 152b.

The first frame connector 153 may be bent at least one time to define a predetermined pattern. The upward and/or downward movement of the bobbin 110 in the first direction, parallel to the optical axis, may be flexibly supported by positional change and fine deformation of the first frame connector 153.

The plurality of first upper support protrusions 143 of the housing 140 may couple and secure the first of first outer frames 152a and 152b of the upper elastic member 150 to the housing 140, as illustrated in FIG. 12. According to the embodiment, the first of first outer frames 152a and 152b may be provided with second of second through holes 157 at positions corresponding to the first upper support protrusions 143 of the first of first outer frames 152a and 152b. The upper support protrusions 143 and the second of second through holes 157 may be coupled to each other through thermal fusion or by means of an adhesive such as epoxy. In order to secure the plurality of first to fourth upper elastic members 150-1, 150-2, 150-3 and 150-4, a sufficient number of first upper support protrusions 143 may be provided. Accordingly, it is possible to inhibit the first to fourth upper elastic members 150-1, 150-2, 150-3 and 150-4 and the housing 140 from being unreliably coupled to each other.

The distance between the plurality of first upper support protrusions 143 may be appropriately set such that the first upper support protrusions do not interfere with peripheral components. Specifically, the first upper support protrusions 143 may be disposed at the corners of the housing 140 at regular intervals so as to be symmetrical about the center of the bobbin 110, or may be disposed at irregular intervals so as to be symmetrical based on a specific imaginary line extending through the center of the bobbin 110.

After the first inner frame 151 is coupled to the bobbin 110 and the first of first outer frames 152a and 152b are coupled to the housing 140, conductive connecting members CP11, CP12, CP13 and CP14, made for example of solder, may be provided between the elastic member contacts 184-1, 184-2, 184-3 and 184-4 of the sensor substrate 180 and the first inner frame 151, as shown in FIG. 10, so as to enable power having different polarities to be applied to two pins P11 and P12, among the four pins P11, P12, P13 and P14 of the first sensor 170, and to enable different feedback signals to be output from two other pins P21 and P22. In order to enable the application of power having different polarities and the output of different feedback signals in this way, the upper elastic member 150 may be divided into the first to fourth upper elastic members 150-1, 150-2, 150-3 and 150-4.

The first to fourth upper elastic members 150-1, 150-2, 150-3 and 150-4 are connected to the printed circuit board 250 through the support members 220. Specifically, the first upper elastic member 150-1 may be connected to the printed circuit board 250 through at least one of the first of first support member 220-1a and the second of first support member 220-1b, and the second upper elastic member 150-2 may be connected to the printed circuit board 250 through the second support member 220-2. Furthermore, the third upper elastic member 150-3 may be connected to the printed circuit board 250 through at least one of the first of third support member 220-3a and the second of third support member 220-3b, and the fourth upper elastic member 150-4 may be connected to the printed circuit board 250 through the fourth support member 220-4. Accordingly, the first sensor 170 may receive power supplied from the printed circuit board 250 through the support members 220 and the upper elastic member 150, or may output feedback signals and provide the feedback signals to the printed circuit board 250. The lower elastic member 160 may include a first lower elastic member 160-1 and a second lower elastic member 160-2, which are conductively isolated from each other. The first coil 120 may be connected to the plurality of support members 220 through the first and second lower elastic members 160-1 and 160-2.

Each of the first and second lower elastic members 160-1 and 160-2 may include at least one of the second inner frames 161-1 and 161-2, at least one of the second outer frames 162-1 and 162-2, and at least one of the second frame connectors 163-1 and 163-2.

The second inner frames 161-1 and 161-2 may be coupled to the bobbin 110, and the second outer frames 162-1 and 162-2 may be coupled to the housing 140. The first of second frame connector 163-1 may connect the second inner frame 161-1 and the second outer frame 162-1, the second of second frame connector 163-2 may connect two second outer frames 162-1 and 162-2, and the third of second frame connector 163-3 may connect the second inner frame 161-2 and the second outer frame 162-2.

The first lower elastic member 160-1 may further include a first coil frame 164-1, and the second lower elastic member 160-2 may further include a second coil frame 164-2. Referring to FIG. 11, the first and second coil frames 164-1 and 164-2 may be connected to both ending lines of the first coil 120 through conductive connecting members, such as solder, at positions on the upper surface thereof which are disposed near the pair of winding protrusions 119, around which the two ending lines of the first coil 120 are wound, whereby the first and second lower elastic members 160-1 and 160-2 may receive power having different polarities and may transmit the power to the first coil 120. In order to enable the application of power having different polarities and transmission of the power to the first coil 120 in this way, the lower elastic member 160 may be divided into the first and second lower elastic members 160-1 and 160-2.

Each of the first and second lower elastic members 160-1 and 160-2 may further include a fourth of second frame connector 163-4. The fourth of second frame connector 163-4 may connect the coil frame 164 and the second inner frame 161-2.

At least one of the first of second through fourth of second frame connectors 163-1, 163-2, 163-3 and 163-4 may be bent at least one time to define a predetermined pattern. Particularly, the upward and/or downward movement of the bobbin 110 in the first direction, parallel to the optical axis, may be flexibly supported by positional change and fine deformation of the first of second frame connector 163-1 and the third of second frame connector 163-3.

According to one embodiment, each of the first and second lower elastic members 160-1 and 160-2 may further include a second protruding frame 165. The second protruding frame 165 protrudes from the second of second frame connector 163-2, to which the conductive member 154 is securely coupled. The upper elastic member 160 may further include fifth and sixth upper elastic members 150-5 and 150-6, which are conductively isolated from each other.

Each of the fifth and sixth upper elastic members 150-5 and 150-6 may further include a first protruding frame 155, to which the conductive member 154 is securely coupled. The conductive member 154 may be connected to the second protruding frame 165, and may be oriented such that the length direction thereof coincides with the first direction.

The first and second protruding frames 155 and 165 may be disposed at positions corresponding to each other in the first direction such that two ends of the conductive member 154 are respectively coupled to the first and second protruding frames 155 and 165 and such that the length direction of the conductive member 154 coincides with the first direction.

Each of the fifth and sixth upper elastic members 150-5 and 150-6 may be connected to the support member 220. In other words, the fifth upper elastic member 150-5 may be connected to a fifth support member 220-5, and the sixth upper elastic member 150-6 may be connected to a sixth support member 220-6.

The first and second lower elastic members 160-1 and 160-2 may be integrally formed with the respective second protruding frames 165. In this way, the fifth and sixth upper elastic members 150-5 and 150-6 may be integrally formed with the respective first protruding frames 155. The upper end of the conductive member 154 may be securely coupled to the first protruding frame 155, and the lower end of the conductive member 154 may be securely coupled to the second protruding frame 165.

Here, the first and second protruding frames 155 and 165 and the conductive member 154 may be securely coupled to each other by means of soldering, a conductive adhesive or the like. In order to ensure the secure coupling between the first and second protruding frames 155 and 165 and the conductive member 154 and to facilitate the coupling work, each of the first and second protruding frames 155 and 165 may be provided with a hole or recess into which the conductive member 154 is fitted.

In this way, each of the first and second lower elastic members 160-1 and 160-2 and each of the fifth and sixth upper elastic members 150-5 and 150-6 may be mechanically and electrically connected to each other via the conductive member 154, which is oriented in the first direction.

The conductive member 154 is preferably made of a flexible or elastic material such that the conductive member 154 flexes in a direction perpendicular to the length direction thereof when the bobbin 110 moves in the second and/or third directions.

The lower ends of the plurality of support members 220 may be securely coupled to the printed circuit board 250, or may be securely coupled to the second coil 230. Accordingly, the lower ends of the plurality of support members 220 may be fixedly secured to the printed circuit board 150 or the second coil 230 even when the bobbin 110 moves in the second and/or third directions.

According to still another embodiment, the housing 140 may further be provided with an insert or a metal attachment (not shown), unlike the embodiment shown in FIG. 12. In this case, the second of first outer frame 158 and the second of second frame connector 163-2 may be connected to each other via the metal attachment. In this case, the first and second protruding frames 155 and 165 and the conductive member 154, which are shown in FIG. 12, may be omitted.

The second of first outer frame 158 may further include the second of second through hole 157, like the first of first outer frame 152b.

According to one embodiment, the first of first outer frames 152a and 152b of the first to sixth upper elastic members 150-1, 150-2, 150-3, 150-4, 150-5 and 150-6 may be disposed to face each other in a diagonal direction, and the second of first outer frames 158 may be disposed to face each other in a diagonal direction. Specifically, the first of first outer frame 152a of the first upper elastic member 150-1 and the first of first outer frame 152a of the third upper elastic member 150-3 may be disposed to face each other in a diagonal direction. Furthermore, the first of first frame 152b of the second upper elastic member 150-2 and the first of first outer frame 152b of the fourth upper elastic member 150-4 may be disposed to face each other in a diagonal direction. In addition, the second of first outer frame 158 of the fifth upper elastic member 150-5 and the second of first outer frame 158 of the sixth upper elastic member 150-6 may be disposed to face each other in a diagonal direction.

It will be appreciated that the first and second lower elastic members 160-1 and 160-2 receive power from the printed circuit board 250 through the fifth and sixth upper elastic members 150-5 and 150-6, connected to the plurality of support members 220, and through the conductive member 154 connecting the first and second lower elastic members 160-1 and 160-2 and the fifth and sixth upper elastic members 150-5 and 150-6, and provide the power to the first coil 120. Specifically, the first lower elastic member 160-1 may be connected to the printed circuit board 250 through the conductive member 154, the sixth upper elastic member 160-6 and the sixth support member 220, and the second lower elastic member 160-2 may be connected to the printed circuit board 250 through the conductive member 154, the fifth upper elastic member 160-5 and the fifth support member 220-5.

Referring to FIG. 11, the lower surface of the bobbin 110 may be provided with a plurality of first lower support protrusions 117 so as to couple or secure the second inner frames 161-1 and 161-2 of the lower elastic member 160 and the bobbin 110 to each other. The lower surface of the housing 140 may be provided with a plurality of second lower support protrusions 145 so as to couple or secure the second outer frames 162-1 and 162-2 of the lower elastic member 160 and the housing 140 to each other.

The number of second lower support protrusions 145 may be greater than the number of first lower support protrusions 117. This is because the second frame connector 163-2 of the lower elastic member 160 is longer than the first frame connector 163-1.

As described above, since the lower elastic member 160 is divided into two lower elastic members, the first and second lower support protrusions 117 and 145 are provided in a sufficient number equal to the number of the first upper support protrusions 143, whereby it is possible to inhibit a gap which would otherwise be created when the lower elastic member 160 is separated. In the case where the lower elastic member 160 is constituted not by divided segments but by a single body, there is no necessity to provide a large number of first and second lower support protrusions 117 and 145 equal to the number of the first upper support protrusions 143. This is because the lower elastic member 160 can be reliably coupled to the housing 140 by only a small number of first and second lower support protrusions 117 and 145.

However, when the lower elastic member 160 is divided into the first and second lower elastic members 160-1 and 160-2, which are conductively isolated from each other, a sufficient number of first and second lower support protrusions 117 and 145 may be provided in order to hold the divided first and second lower elastic members 160-1 and 160-2. Accordingly, it is possible to inhibit the first and second lower elastic members 160-1 and 160-2 and the housing 140 from being incompletely coupled to each other.

As shown in FIG. 12, according to the embodiment, the second inner frames 161-1 and 161-2 of the first and second lower elastic members 160-1 and 160-2 may be provided with third through holes 161a, which are formed at positions corresponding to the first lower support protrusions 117 and have a shape corresponding to that of the first lower support protrusions 117. The first lower support protrusions 117 and the third through holes 161a may be coupled to each other through thermal fusion or by means of an adhesive such as epoxy.

Furthermore, the second outer frames 162-1 and 162-2 of each of the first and second lower elastic members 160-1 and 160-2 may be provided with fourth through holes 162a, which are formed at positions corresponding to the second lower support protrusions 145. The second lower support protrusions 145 and the fourth through holes 162a may be coupled to each other through thermal fusion or by means of an adhesive such as epoxy.

The distance between the plurality of first lower support protrusions 117 and 145 may be appropriately set such that the first lower support protrusions do not interfere with peripheral components. Specifically, the first and second lower support protrusions 117 and 145 may be disposed at irregular intervals so as to be symmetrical about the center point of the bobbin 110. Although the upper elastic member 150 and the lower elastic member 160 may be embodied as springs, the embodiments are not limited as to the material of the upper and lower elastic members 150 and 160.

The bobbin 110, the housing 140 and the upper and lower elastic members 150 and 160 may be assembled to each other through thermal fusion and/or a bonding procedure using an adhesive. Here, the assembly may be performed in such a manner as to perform thermal fusion and then a bonding procedure using an adhesive depending on the assembly sequence.

For example, when the bobbin 110 and the second inner frames 161-1 and 161-2 of the lower elastic member 160 are assembled to each other in the first sequence in the first assembly and then the housing 140 and the second outer frames 162-1 and 162-2 of the lower elastic member 160 are secondly assembled to each other in the second assembly, the first lower support protrusions 117 of the bobbin 110 may be coupled to the third through holes 161a and the second lower support protrusions 145 of the housing 140 may be coupled to the fourth through holes 162a through thermal fusion. When the first inner frame 151 of the upper elastic member 150 is first assembled in the third assembly, the elastic member contacts 184-1, 184-2, 184-3 and 184-4 of the sensor substrate 180 and the first inner frames 151 of the first to fourth upper elastic members 150-1, 150-2, 150-3 and 150-4 may be coupled to each other through thermal fusion. Thereafter, when the housing 140 and the first of first and second of first outer frames 152a, 152b and 158 of the upper elastic member 150 are coupled to each other in the fourth assembly, the second of second through holes 157 may be bonded to the first upper support protrusions 143 of the housing 140 through the application of an adhesive such as epoxy. However, this assembly sequence may be changed. In other words, the first to third assemblies may be performed through thermal fusion, and the fourth assembly may be performed through bonding. Although thermal fusion may involve deformation such as distortion, the bonding in the fourth assembly may compensate for such deformation.

In the above embodiment, power may be supplied to the first sensor 170 through the two upper elastic members 160, which are conductively isolated from each other, a feedback signal output from the first sensor 170 may be transmitted to the printed circuit board 250 through two other upper elastic members 150, which are conductively isolated from each other, and power may be supplied to the first coil 120 through the two lower elastic members 160, which are conductively isolated from each other. However, the embodiments are not limited thereto.

According to another embodiment, the role of the plurality of upper elastic members 150 and that of the plurality of lower elastic members 160 may be swapped. Specifically, power may be supplied to the first coil 120 through the two upper elastic members 150, which are conductively isolated from each other, power may be supplied to the first sensor 170 through two lower elastic members 160, which are conductively isolated from each other, and a feedback signal output from the first sensor 170 may be transmitted to the printed circuit board 250 through two other lower elastic members 160. Although not illustrated, this will be readily understood from the preceding drawings.

Referring to FIGS. 3, 6, 7, 10 and 11, the outer side surface of the housing 140 may be provided with a plurality of third stoppers 149. The third stoppers 149 are intended to inhibit the body of the housing 140 from colliding with the cover member 300 when the first lens moving unit moves in the second and/or third directions in order to inhibit the side surface of the housing 140 from directly colliding with the inner surface of the cover member 300 upon the application of external impact. As shown in the drawings, although the third stoppers 149 are disposed two on each outer surface of the housing 140 with a constant interval therebetween, the embodiments are not limited as to the positions or number of the third stoppers 149.

Although not shown in the drawings, the housing 140 may further be provided at the lower surface thereof with fourth stoppers. The fourth stoppers may project from the lower surface of the housing 140. The fourth stoppers may serve to inhibit the lower surface of the housing 140 from colliding with the base 210 and/or the printed circuit board 250, which will be described later. In addition, the fourth stoppers may be maintained in the state of being spaced apart from the base 210 and/or the printed circuit board 250 by a predetermined distance when the fourth stoppers are in the initial position and are operating normally. By virtue of this construction, the housing 140 may be spaced apart downward from the base 210 and may be spaced apart upward from the cover member 300, whereby the housing 140 may be maintained at a constant level in the optical axis direction without interference with other components. Accordingly, the housing 140 may move in the second and/or third directions.

The first lens moving unit according to the embodiment may precisely control the movement of the bobbin 110 by detecting the position of the bobbin 110 in the optical axis direction, that is, the first direction or a direction parallel to the first direction. This may be achieved through feedback by providing information about the position, detected by the first sensor 170, to the outside through the printed circuit board 250.

According to one embodiment, in order to move the bobbin 110 in the optical axis direction, that is, the first direction or a direction parallel to the first direction, a magnet (hereinafter referred to as the detecting magnet; not shown), which faces the first sensor 170, may further be provided, in addition to the magnet 130 (hereinafter referred to as the autofocusing magnet) that faces the first coil 120. In this embodiment, the interaction between the autofocusing magnet 130 and the first coil 120 may be obstructed by the detecting magnet. This is because a magnetic field may be generated by the detecting magnet. Accordingly, in order to inhibit the detecting magnet, which is separately provided, from interacting with the autofocusing magnet 130 or in order to inhibit the bobbin 110 from being tilted but to allow the interaction between the detecting magnet and the autofocusing magnet 130, the first sensor 170 may be disposed to face the detecting magnet. In this case, the first sensor 170 may be disposed, coupled or mounted on the bobbin 110, and the detecting magnet may be disposed, coupled or mounted on the housing 140. Alternatively, the first sensor 170 may be disposed, coupled or mounted on the housing 140, and the detecting magnet may be disposed, coupled or mounted on the bobbin 110.

According to another embodiment, in place of additional disposition of the detecting magnet, the autofocusing magnet may be used as the detecting magnet in order to move the bobbin 110 in the optical axis direction, that is, the first direction or a direction parallel to the first direction. For example, in order for the autofocusing magnet 130 to also serve as the detecting magnet, the first sensor 170 may not be disposed on the housing 140 but may be disposed, coupled or mounted on the bobbin 110 so as to be moved with the bobbin 110. Accordingly, when both the autofocusing magnet and the detecting magnet are present together, problems caused by the interaction between the two magnets may be fundamentally solved. For example, it is not necessary to provide a piece of magnetic field blocking metal (not shown) for minimizing the interaction between the autofocusing magnet and the detecting magnet.

In some cases, the first lens moving unit may further include various devices for improving the autofocusing function, in addition to the first sensor 170. In this case, the positions of the devices or the method or process of receiving power through the printed circuit board 250 and supplying feedback signals to the printed circuit board 250 may be identical to those of the first sensor 170.

Referring again to FIG. 2, the second lens moving unit, which serves as a handshake correction lens moving unit, may include the first lens moving unit, the base 210, the plurality of support members 220, the second coil 230, the second sensor 240, and the printed circuit board 250.

Although the first lens moving unit may include the above-mentioned components, the above-mentioned components may be replaced with another optical system capable of fulfilling the autofocusing function. Specifically, the first lens moving unit may be constituted by an optical module using a single lens moving actuator or a variable refractive index actuator, in place of using an autofocusing actuator employing a voice coil motor. In other words, the first lens moving unit may adopt any optical actuator as long as it is capable of fulfilling an autofocusing function. However, there is a need to install the magnet 130 at a position corresponding to the second coil 230, which will be described later.

Figure 13:
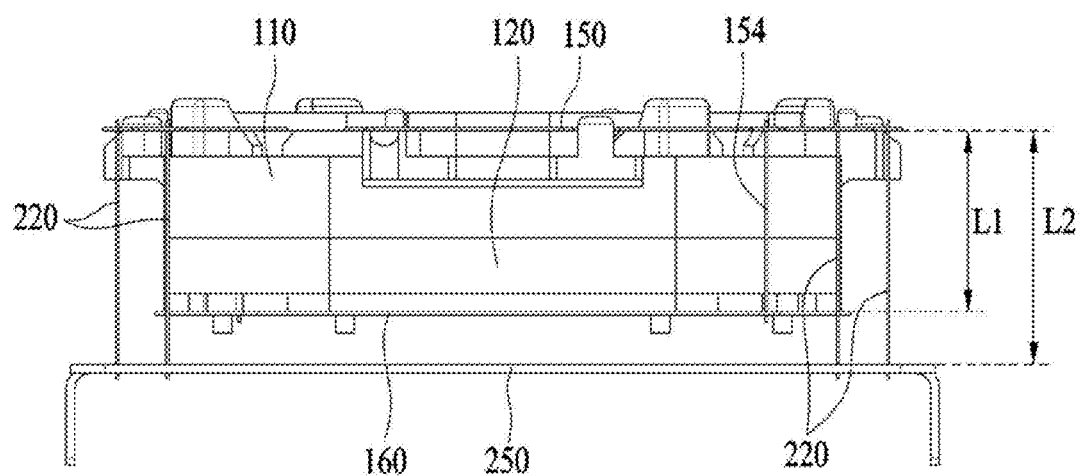
FIG. 13 is a front view showing the upper elastic member, the lower elastic member, the support members, the conductive member, the printed circuit board, the bobbin and the first coil according to the embodiment, all of which are assembled to one another.

FIG. 13 is a front view showing the upper elastic member 150, the lower elastic member 160, the support members 220, the conductive member 154, the printed circuit board 250, the bobbin 110 and the first coil 120 according to the embodiment, all of which are assembled to one another.

The conductive member 154 may be configured to have a shorter length than the support member 220. Specifically, a first length L1, that is, the length of the conductive member 154, which is the distance between the lower surface of the upper elastic member 150 and the upper surface of the lower elastic member 160, may be shorter than a second length L2, that is, the length of the support member 220, which is the distance between the lower surface of the upper elastic member 150 and the upper surface of the printed circuit board 250.

This is because the lower end of the conductive member 154 is securely coupled to the lower elastic member 160, the lower end of the support member 220 is fitted or coupled to the printed circuit board and there is a certain distance between the lower elastic member 160 and the printed circuit board.

The first length L1 may be appropriately selected in consideration of ease of assembly of the lens moving apparatus, the size of the bobbin 110, or the like. Accordingly, the first length L1 may be in a range of 0.1 mm to 1 mm, preferably in a range of 0.3 mm to 0.5 mm. In the embodiment, the upper elastic member 150 and the lower elastic member 160 are mechanically and electrically connected to each other via the conductive member 154 such that current from the printed circuit board 250 is applied to the lower elastic member 160.

When the lower elastic member 160 is directly connected to the support member 220, the lower elastic member 160 is positioned near the lower end of the support member 220, which is the portion that is secured to the printed circuit board 250 or the second coil 230. When the bobbin 110 moves in the second and/or third directions, there is a need to provide a high driving force in order to bend the support member 220, which is coupled to both the upper and lower elastic members 150 and 160, in the second and/or third directions.

However, since the support member 220 is coupled only to the upper elastic member 150 and the coupled portion is positioned at a relatively long distance from the lower end of the support member 220, which is secured to the printed circuit board 250 or the second coil 230 in the embodiment, the support member 220 may be sufficiently bent in the second and/or third directions even by a remarkably low driving force, compared to the case in which the lower elastic member 160 is directly connected to the support member 220.

Accordingly, by virtue of the above construction, the embodiment has an advantage in that it is possible to reduce the driving force required to drive the bobbin 110 in the second and/or third directions.

Consequently, the lens moving apparatus according to the embodiment has an effect of reducing a driving force required to move the bobbin 110 in the second and/or third directions by virtue of the above-described structure.

Consequently, the lens moving apparatus according to the embodiment has an effect of performing handshake correction even using a low driving force. Furthermore, since excessive driving force is not applied to the support member 220, there is an effect of improving the durability of the lens moving apparatus including the support member 220.

Figure 14:
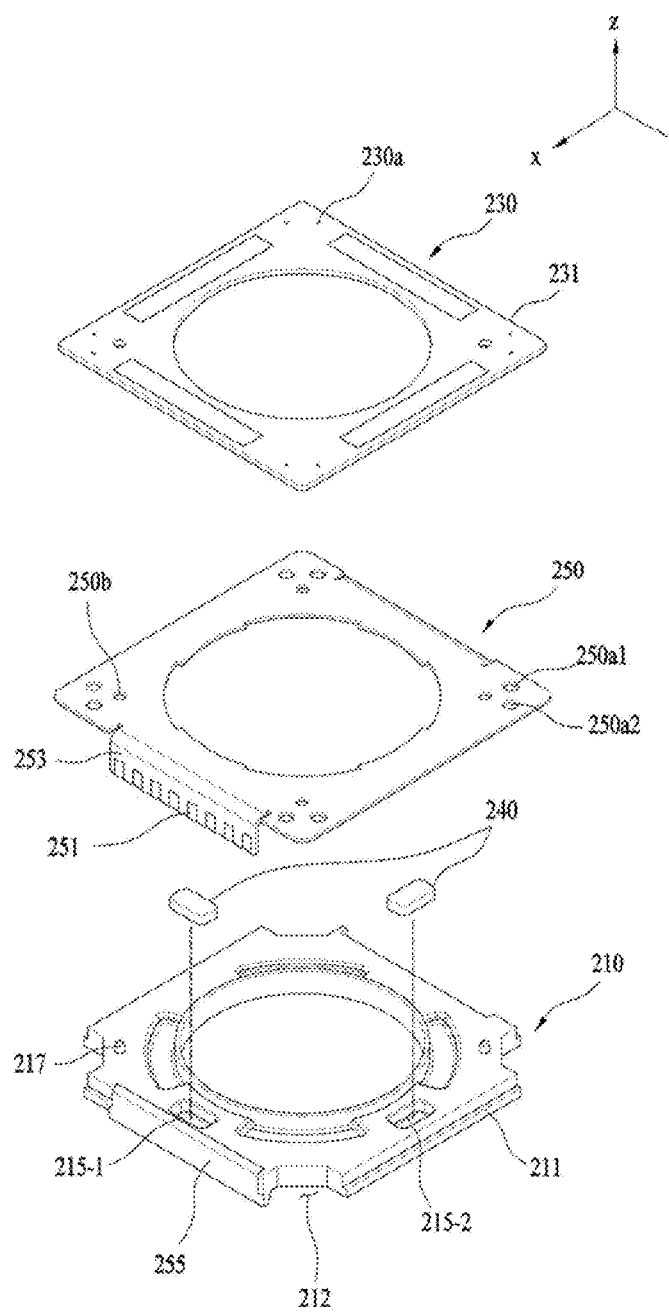
FIG. 14 is an exploded perspective view of the base, the second coil and the printed circuit board.

FIG. 14 is an exploded perspective view of the base 210, the second coil 230 and the printed circuit board 250.

As shown in FIGS. 2 and 14, the base 210 of the second lens moving unit may have an approximately rectangular shape when viewed in a plan view. The base 210 may be provided with stepped portions 211, to which an adhesive is applied when adhesively securing the cover member 300 to the base 210, as illustrated in FIG. 14. The stepped portion 211 may guide the cover member 300, which is coupled on the base 210, and may enable the cover member 300 to contact the base 210 in a surface-contact manner. The stepped portions 211 and the end of the cover member 300 may be adhesively secured to each other and may be sealed shut using an adhesive or the like.

The base 210 may be disposed so as to be spaced apart from the first lens moving unit by a predetermined distance. The base 210 may be provided with a supporting portion 255, which is positioned at the portion of the base 210 at which terminals 251 of the printed circuit board 250 are formed and which has a size corresponding to that portion of the base 210. The supporting portion 255 may be configured to have a constant cross-sectional area without the stepped portion 211 so as to support a terminal pad 253 having the terminals 251.

The base 210 may have second recesses 212 formed in the corners thereof. When the cover member 300 includes projections formed at the corners thereof, the projections of the cover member 300 may be fitted into the second recesses 212.

The base 210 may be provided in the upper surface thereof with second mounting recesses 215-1 and 215-2 in which the second sensors 240 are disposed. According to the embodiment, two second mounting recesses 215-1 and 215-2 are provided, and the second sensors 240 are respectively disposed in the second mounting recesses 215-1 and 215-2, whereby the second sensors 240 are able to detect the extent by which the housing 140 moves in the second and/or third directions. To this end, the two second mounting recesses 215-1 and 215-2 may be disposed such that the angle defined by two imaginary lines connecting the two second mounting recesses 215-1 and 215-2 and the center of the base 210 is 90°.

Each of the second mounting recesses 215-1 and 215-2 may be provided on at least one surface thereof with an inclined surface (not shown) so as to allow epoxy or the like for the assembly of the second sensors 240 to be more easily injected through the inclined surface. The additional epoxy or the like may not be injected into the second mounting recesses 215-1 and 215-2, or may be injected in order to secure the second sensors 240 in place. The second mounting recesses 215-1 and 215-2 may be disposed at or near the center of the second coil 230. The center of the second coil 230 and the center of the second sensor 240 may coincide with each other. According to the embodiment, the second mounting recesses 215-1 and 215-2 may be formed near the sides of the base 210.

The cover member 300 may be provided with a groove in a position corresponding to the stepped portion 211 of the base 210 so as to allow the injection of an adhesive or the like through the groove. At this point, since the adhesive, which is injected through the groove, has a low viscosity, the adhesive can easily infiltrate between the stepped portion 211 and the end surface of the cover member 300. The adhesive, which is applied to the groove, may fill the gap between the mating surfaces of the cover member 300 and the base 210 through the groove, and thus the cover member 300 may be sealingly coupled to the base 210.

The base 210 may further be provided on the lower surface thereof with a mounting seat (not shown) on which a filter is installed. The filter may be an infrared screening filter. However, the embodiments are not limited thereto, and the base 210 may be provided on the lower surface thereof with an additional sensor holder at which a filter is disposed. The base 210 may be provided on the lower surface thereof with a sensor substrate, on which an image sensor is mounted so as to constitute a camera module.

The plurality of support members 220 may be disposed at the second side portions 142 of the housing 140. As described above, when the housing 140 has, for example, a polygonal shape when viewed in a plan view, the housing 140 may have a plurality of second side portions 142. If the interior of the lower end of the housing 140 has an octagonal shape, the plurality of support members 220 may be disposed at four second side portions 142, among the eight side portions. For example, each of the four second side portions 142 may be provided with two support members 220, and a total of eight support members 220 may thus be provided.

Alternatively, among the four second side portions 142 of the housing 140, each of two second side portions 142 may be provided with only one support member 220, and each of the other two second side portions 142 may be provided with two support members 220, with the result that a total of six support members 220 may be provided.

As described above, the support members 220 may serve as the paths for transmitting the power required for the first sensor 170 and the first coil 120 and the paths for providing the printed circuit board 250 with the feedback signals output from the first sensor 170.

Furthermore, since the support members 220 serve to return the housing 140 to its usual position after the housing 140 has moved in the second and/or third directions in the first lens moving unit, when the same number of support members 220 are symmetrically disposed in the diagonal direction, the elastic coefficient may be balanced. Specifically, when the housing 140 moves in the second and/or third directions in the plane perpendicular to the optical axis direction, the support members 220 may be finely deformed in the direction in which the housing 140 moves or in the length direction of the support members 220. Here, the term "length direction" may refer to the direction connecting the upper end and lower end of each wire of the support members 220. Accordingly, the housing 140 can move only in the second and/or third directions, which are substantially perpendicular to the optical axis, with almost no displacement in the first direction, which is parallel to the optical axis, thus improving the accuracy of handshake correction.

This may be obtained by the characteristic whereby the support members 220 are capable of being stretched.

As shown in FIG. 12, the four first to fourth support members 220-1, 220-2, 220-3 and 220-4, each of which includes a pair of support members, are disposed two at each of four second side portions 142 among the eight side portions so as to support the housing 140 in the state of being spaced apart from the base 210 by a predetermined distance.

The first to fourth support members 220-1, 220-2, 220-3 and 220-4 according to the embodiment may be respectively disposed at the second side portions 142 of the housing 140 so as to be symmetrical with one another. However, the embodiments are not limited thereto. In other words, the shape and number of the plurality of support members 220 may be set to be symmetrical to one another in the second and third directions, which are perpendicular to the first direction. In consideration of the above-mentioned elastic coefficient, the number of support members 220 may be eight.

Although the support members 220 have been described as being embodied as suspension wires without a predetermined pattern in the above embodiment, the embodiments are not limited thereto. According to another embodiment, the support members 200 may be embodied as support plates having elastic deformation portions (not shown).

Referring to FIG. 14, the second coil 230 may include fifth through holes 230a, which are formed through the corner regions of a circuit member 231. The support members 220 may extend through the fifth through holes 230a and may be connected to the printed circuit board 250.

The support member 220 may be fitted into the fifth through hole 230a, and may be securely coupled to the second coil 230 by means of soldering, a conductive adhesive or the like. As described above, the support member 220 may be securely coupled to the printed circuit board 250.

The second coil 230 may be disposed to face the magnet 130 secured to the housing 140. For example, the second coil 230 may be disposed outside the magnet 130. Alternatively, the second coil 230 may be disposed under the magnet 130 so as to be spaced apart from the magnet 130 by a predetermined distance.

According to the embodiment, although the second coil 230 may include a total of four second coils, which are disposed at the four sides of the printed circuit board 250, as shown in FIG. 14, the embodiments are not limited thereto. Only two coils 230, namely, a second coil for the second direction and a second coil for the third direction, may be provided, or four or more second coils 230 may also be provided. According to the embodiment, a circuit pattern may be formed on the printed circuit board 250 so as to have the shape of the second coil 230, and an additional second coil 230 may be disposed on the printed circuit board 250. However, the embodiments are not limited thereto, and only the second coil 230 may be disposed on the printed circuit board 250 without forming the circuit pattern having the shape of the second coil 230 on the printed circuit board 250. Alternatively, the second coil 230, which is constituted by winding a wire into a doughnut shape or which is constituted by a finely patterned coil, may be conductively connected to the printed circuit board 250.

The circuit member 231 including the second coil 230 may be mounted on the printed circuit board 250 disposed over the base 210. However, the embodiments are not limited thereto, and the second coil 230 may be closely disposed on the base, or may be spaced apart from the base 210 by a predetermined distance. Furthermore, the second coil 230 may be formed on an additional substrate, and the substrate may be layered on the printed circuit board 250 and may be connected thereto.

As described above, the housing 140 may be moved in the second and/or third directions by the interaction of the magnets 130, which are disposed to face each other, and the second coil 230, thus implementing handshake correction. To this end, the first to fourth support members 220 may support the housing 140 with respect to the base 210 such that the housing 140 can move in the second and/or third directions, which are perpendicular to the first direction.

The second sensors 240 may detect displacement of the first lens moving unit with respect to the base 210 in the second and/or third directions, which are perpendicular to the optical axis. To this end, the second sensors 240 may be disposed at the center of the second coil 230 by a predetermined distance in the first direction, with the printed circuit board 250 disposed therebetween so as to detect movement of the housing 140. In other words, the second sensors 240 are not directly connected to the second coil 230, and the printed circuit board 250 may be provided on the upper surface thereof with the second coil 230 and on the lower surface thereof with the second sensors 240. According to the embodiment, the second sensors 240, the second coil 230 and the magnet 130 may be disposed on the same axis.

The second sensors 240 may be embodied as Hall sensors, but may alternatively be embodied as any sensor as long as it is capable of detecting variation in magnetic force. As shown in FIG. 14, two second sensors 240 may be disposed near the sides of the base 210 disposed under the printed circuit board 250, and may be fitted in the second mounting recesses 215-1 and 215-2 formed in the base 210.

The printed circuit board 250 may include sixth through holes 250a1 and 250a2 through which the support members 220 extend. The support members 220 may extend through the sixth through holes 250a1 and 250a2 in the printed circuit board 250 and may be conductively connected to the associated circuit patterns, which may be disposed on the lower surface of the printed circuit board 250, via soldering.

The printed circuit board 250 may further include seventh through holes 250b. The second upper support protrusions 217 of the base 210 and the seventh through holes 250b may be coupled as shown in FIG. 14, and may be secured to each other through thermal fusion or by means of an adhesive such as epoxy.

The printed circuit board 250 may include a plurality of terminals 251. The printed circuit board 250 may be provided with the bent terminal pad 253. According to the embodiment, the one bent terminal pad 253 of the printed circuit board 250 may be provided with at least one terminal 251.

According to the embodiment, the plurality of terminals 251 provided on the terminal pad 253 may receive external power, and may supply the power to the first and second coils 120 and 130 and the first and second sensors 170 and 240. Furthermore, the plurality of terminals 251 may output the feedback signals, output from the first sensor 170, to the outside. The number of terminals 251 provided on the terminal pad 252 may be increased or decreased depending on the kinds of components to be controlled.

According to the embodiment, although the printed circuit board 250 may be embodied as an FPCB, the embodiments are not limited thereto. The terminals of the printed circuit board 250 may be directly formed on the base 210 through a process of forming a surface electrode. As described above, the printed circuit board 250 may supply power (or current) required for the first coil 120 and the first sensor 170, and may receive the feedback signals from the first sensor 170 so as to adjust the displacement of the bobbin 110.

By virtue of the above-described construction, the respective autofocusing and handshake correction operations of the first and second lens moving units may be realized by sharing the magnet 130.

In the lens moving apparatus according to the embodiments, the first sensor 170 may be disposed, coupled or mounted on the housing 140 or the bobbin 110, and the autofocusing magnet 130 may be shared as the detecting magnet, or the detecting magnet may be additionally disposed. If the autofocusing magnet 130 is shared as the detecting magnet, or the detecting magnet is positioned so as not to interact with the autofocusing magnet 130, the detecting magnet does not affect the autofocusing magnet 130. Consequently, tilting of the bobbin 110 does not occur, and the accuracy of the feedback signal is improved. Furthermore, the number of components is not increased, and the weight of the housing 140 is reduced, thus improving responsiveness. Of course, the autofocusing magnet and the handshake correction magnet may be independently constructed.

Second Embodiment

Figure 15:
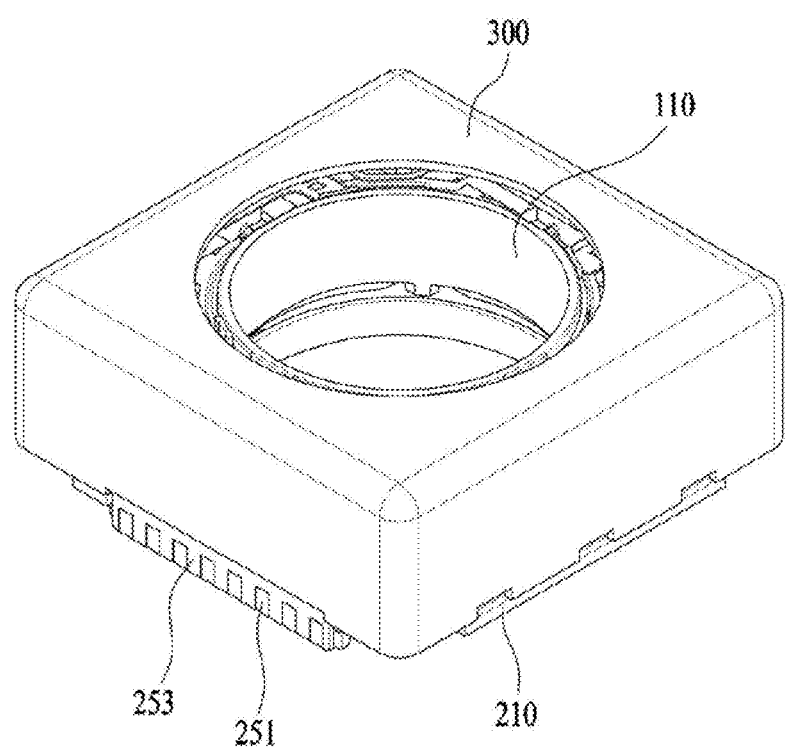
FIG. 15 is a perspective view showing a lens moving apparatus according to a second embodiment of the present invention.
Figure 16:
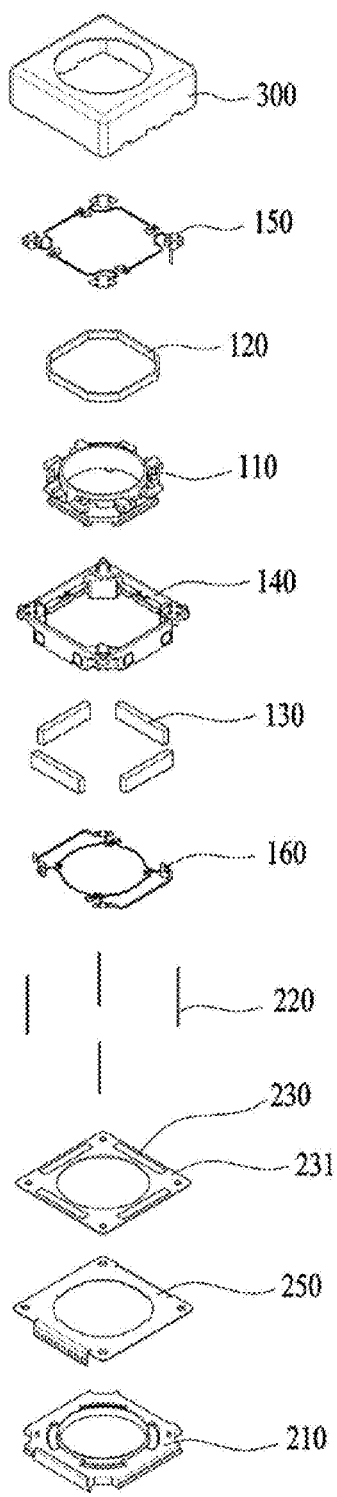
FIG. 16 is an exploded perspective view showing the lens moving apparatus according to the second embodiment.

FIG. 15 is a perspective view showing a lens moving apparatus according to a second embodiment of the present invention. FIG. 16 is an exploded perspective view showing the lens moving apparatus according to the second embodiment.

As shown in FIGS. 15 and 16, the lens moving apparatus according to this embodiment may include a movable unit. The movable unit may fulfill the functions of autofocusing and handshake correction of a lens. The movable unit may include a bobbin 110, a first coil 120, a first magnet 130, a housing 140, an upper elastic member 150 and a lower elastic member 160.

The bobbin 110 may be provided in the housing 300, and the first coil 120, which is disposed inside the first magnet 130, may be provided on the outer circumferential surface of the bobbin 110. The bobbin 110 may be reciprocated in the first direction in the internal space of the housing 140 by electromagnetic interaction between the first magnet 130 and the first coil 120. The first coil 120 is provided on the outer circumferential surface of the bobbin 110 so as to undergo electromagnetic interaction with the first magnet 130.

The bobbin 110 is moved in the first direction in the state of being elastically supported by the upper and lower elastic members 150 and 160, thereby fulfilling the autofocusing function.

The bobbin 110 may include a lens barrel (not shown) in which at least one lens is mounted. The lens barrel may be coupled to the inside of the bobbin 110 in various manners. The autofocusing function may be controlled by the direction of electric current, and may be fulfilled by moving the bobbin 110 in the first direction. For example, the bobbin 110 may move upward from its initial position upon the application of forward current, whereas the bobbin 110 may move downward from its initial position upon the application of reverse current. In addition, the distance that the bobbin 110 moves from its initial position in one direction may be increased or decreased by controlling the amount of current flowing in the corresponding direction.

The bobbin 110 may be provided at upper and lower surfaces thereof with a plurality of upper support protrusions and a plurality of lower support protrusions. The upper support protrusions may be configured to have a cylindrical shape or a polygonal column shape so as to secure the upper elastic member 150. The lower support protrusions may be configured to have a cylindrical shape or a polygonal column shape so as to secure the lower elastic member 160.

The upper elastic member 150 may have through holes corresponding to the upper support protrusions, and the lower elastic member 160 may have through holes corresponding to the lower support protrusions. The respective support protrusions and the respective through holes may be securely coupled to each other by means of thermal fusion or an adhesive such as epoxy.

The housing 140 may have a hollow column shape for supporting the first magnet 130, and may be configured to have an approximately rectangular shape. The housing 140 may be provided at a lateral side thereof with the first magnet 130 and support members 220 coupled thereto. As in the first embodiment, the housing 140 may be provided on the inner surface thereof with the bobbin 110, which is guided by the housing 140 and is moved in the first direction.

The upper elastic member 150 and the lower elastic member 160 may each be coupled to both the housing 140 and the bobbin 110, and may elastically support upward and/or downward movement of the bobbin 110 in the first direction. The upper and lower elastic members 150 and 160 may be constituted by a leaf spring.

As shown in FIG. 16, the upper elastic member 150 may include a plurality of upper elastic members, which are separated from each other. By virtue of this multiply-segmented structure, the respective segments of the upper elastic member 150 may receive current having different polarities or different powers. The lower elastic member 160 may also include a plurality of lower elastic members, which are separated from each other, and may be conductively connected to the upper elastic member 150.

The upper elastic member 150, the lower elastic member 160, the bobbin 110 and the housing 140 may be assembled to one another through thermal fusion and/or bonding using an adhesive or the like. Here, the assembly may be performed in such a manner as to perform thermal fusion first, followed by a bonding procedure using an adhesive, depending on the assembly sequence.

The base 210, which is configured to have an approximately rectangular shape, may be disposed under the bobbin 110, and a printed circuit board 250 may be mounted on the base 210. The regions of the base 210 that face terminal members 253 of the printed circuit board 250 may be provided with respective support recesses having a size corresponding to that of the terminal members 253. The support recesses may be recessed from the outer circumferential surfaces of the base 210 by a predetermined depth such that the terminal members 253 do not protrude outward from the outer circumferential surface of the base 210 or such that the extent to which the terminal members 253 protrude can be controlled.

The support members 220 are disposed on lateral sides of the housing 140 such that the upper sides of the support members 220 are coupled to the housing 140 and the lower sides of the support members 220 are coupled to the base 210. The support members 220 may support the bobbin 110 and the housing 140 in such a manner as to allow the bobbin 110 and the housing 140 to move in the second and third directions, perpendicular to the first direction. The support members 220 may be conductively connected to the first coil 120.

Since the support members 220 according to the embodiment are disposed on the outer surfaces of the respective corners of the housing 140, a total of four support members 220 may be disposed. The support members 220 may be conductively connected to the upper elastic member 150. Specifically, the support members 220 may be conductively connected to regions around the through holes.

Since the support members 220 are made of a different material from that of the upper elastic member 150, the support members 220 may be conductively connected to the upper elastic member 150 by means of a conductive adhesive, solder or the like. Consequently, the upper elastic member 150 may apply current to the first coil 120 through the support members 220 conductively connected thereto.

Although the support members 220 are illustrated in FIG. 16 as being embodied as linear support members according to the embodiment, the support members 220 are not limited thereto. In other words, the support members 220 may be configured to have a plate shape or the like. Second coils 230 may move the housing 140 in the second and/or third directions to perform the handshake correction by virtue of electromagnetic interaction with the first magnets 130. Accordingly, the first magnets 130 are required to be disposed at positions corresponding to the second coils 230.

The second coils 230 may be disposed so as to face the first magnets 130, which are secured to the housing 140. In one embodiment, the second coils 230 may be disposed outside the first magnets 130, or may be disposed under the first magnets 130 so as to be spaced apart from the first magnets 130 by a predetermined distance.

Although a total of four second coils 230 may be disposed one on each side of a circuit member 231 according to the embodiment, the disclosure is not limited thereto. Only two second coils 230, that is, one second coil for movement in the second direction and one second coil for movement in the third direction, may be provided, or a total of more than four second coils 230 may be provided.

In the embodiment, although circuit patterns having the shape of the second coils 230 are formed on the circuit member 231 and additional second coils are disposed on the circuit board 231, the disclosure is not limited thereto. Alternatively, only additional second coils may be disposed on the circuit member 231, without forming the circuit patterns having the shape of the second coils 230.

Furthermore, the second coils 230, which have been prepared by winding wires into a doughnut shape or which have the shape of a finely patterned coil, may be conductively connected to the printed circuit board 250.

The circuit member 231 including the second coils 230 may be disposed on the upper surface of the printed circuit board 250, which is positioned over the base 210. However, the disclosure is not limited thereto, and the second coils 230 may be disposed on the base 210 in a state of being in close contact therewith, or may be spaced apart from the base 210 by a predetermined distance. In other examples, a substrate on which the second coils are formed may be layered on the printed circuit board 250 and connected thereto.

The printed circuit board 250 may be conductively connected to at least one of the upper elastic member 150 and the lower elastic member 160, and may be coupled to the upper surface of the base 210. As shown in FIG. 16, the printed circuit board 250 may have through holes formed at positions corresponding to the support members 220, so as to allow the support members 220 to be fitted into the through holes.

Figure 21:
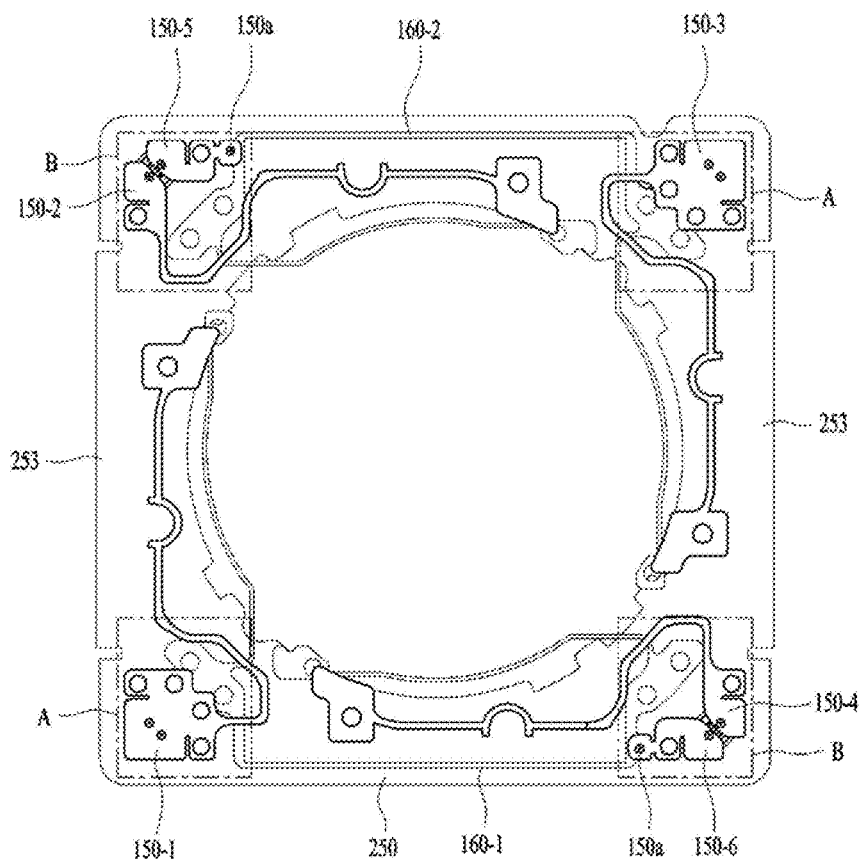
FIG. 21 is a plan view of FIG. 18.

The printed circuit board 250 may be provided with the terminal members 253, which are formed by bending portions of the printed circuit board 250. Referring to FIG. 21, the printed circuit board 250 according to the embodiment includes two bent terminal members 253. Each terminal member 253 includes a plurality of terminals 251 for the application of external power to the terminal members 253, whereby current is supplied to the first coil 120 and the second coils 230. The number of terminals 251 provided on each terminal member 253 may be increased or decreased depending on the kinds of components to be controlled. Alternatively, the number of terminal members 253 provided on the printed circuit board may be one or three or more.

A cover member 300, which is configured to have an approximate box shape, may accommodate the movable unit, the second coil 230 and a portion of the printed circuit board 250, and may be coupled to the base 210. The cover member 300 may serve to protect the movable unit, the second coils 230, the printed circuit board 250 and the like, accommodated therein, from damage, and may serve to inhibit an electromagnetic field, which is generated by the first magnets 130, the first coil 120, the second coils 230 and the like, from leaking outward, thereby concentrating the electromagnetic field.

Figure 17:
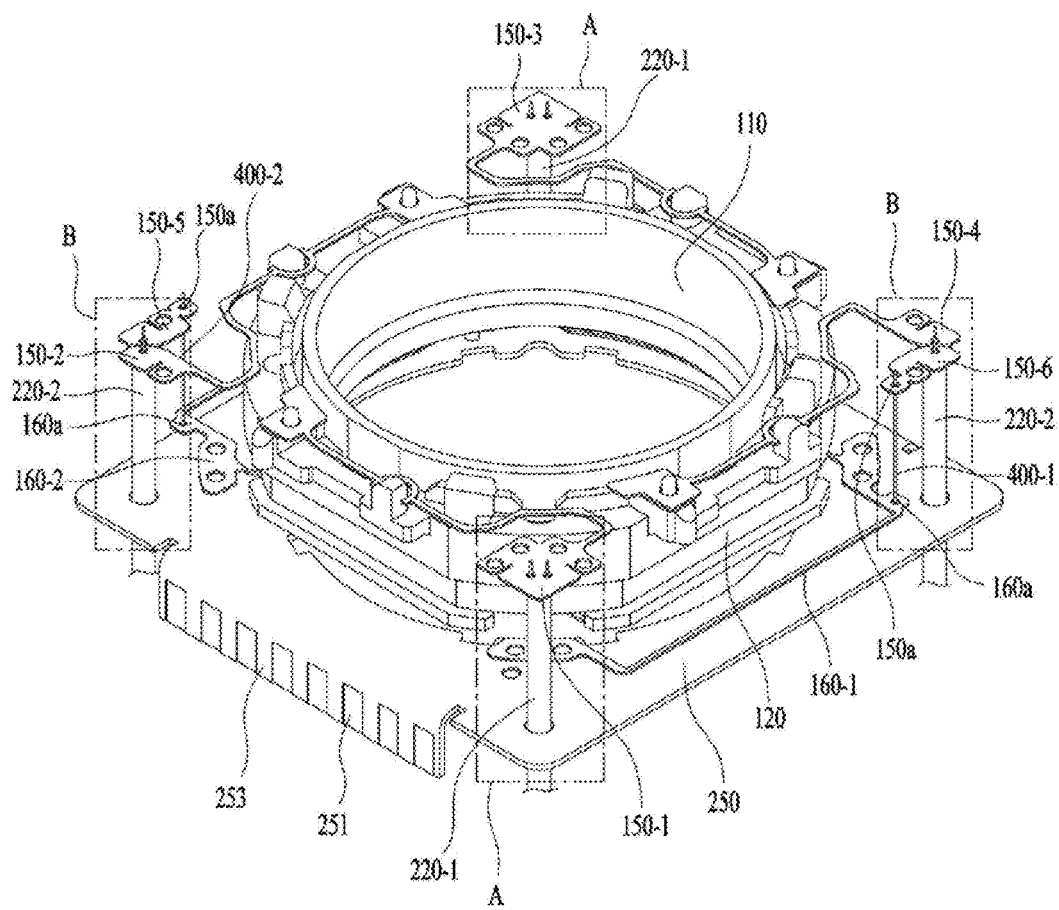
FIG. 17 is a perspective view showing some of the components of the lens moving apparatus according to the second embodiment.
Figure 18:
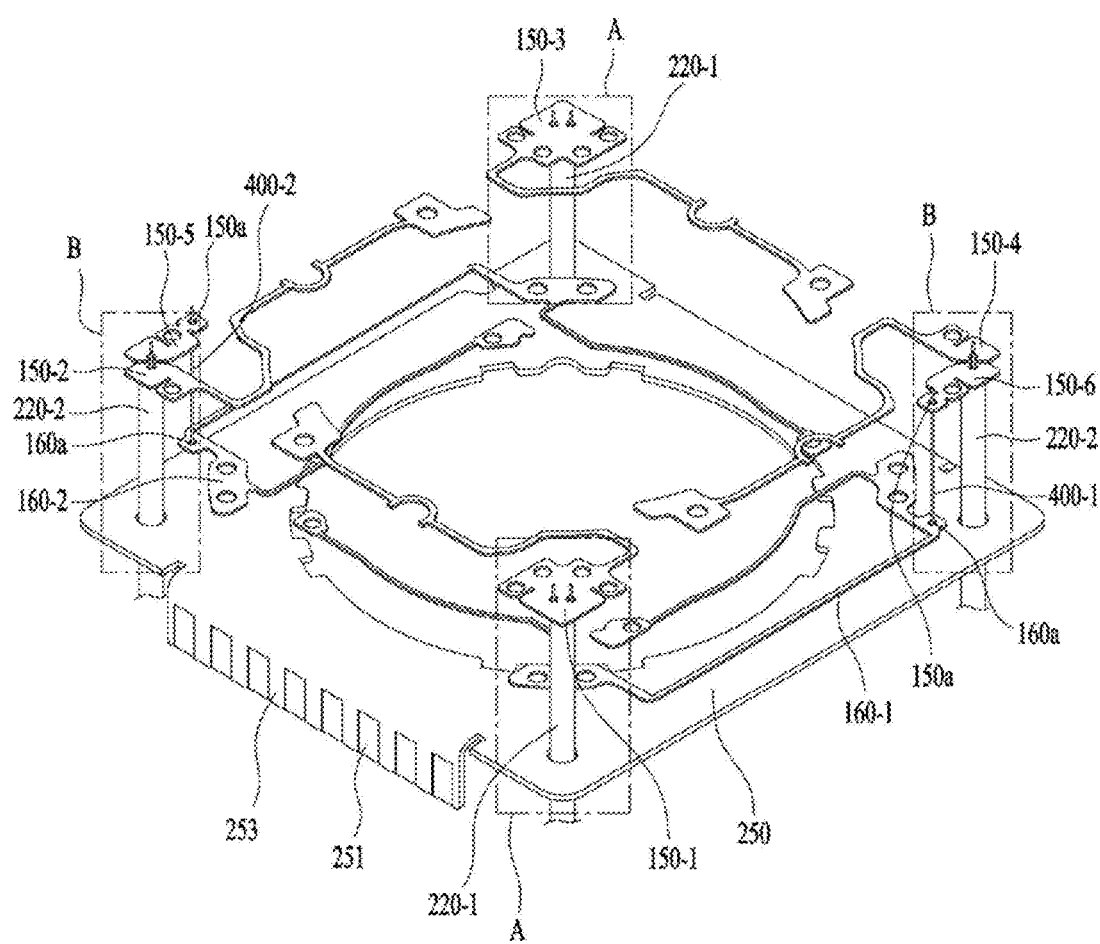
FIG. 18 is a perspective view of FIG. 17, from which the bobbin and the first coil are removed.

FIG. 17 is a perspective view showing some of the components of the lens moving apparatus according to the second embodiment. FIG. 18 is a perspective view of FIG. 17, from which the bobbin 110 and the first coil 120 have been removed. As shown in FIGS. 17 and 18, each of the upper and lower elastic members 150 and 160 may be divided into multiple segments.

For example, the upper elastic member 150 may include a first upper elastic member 150-1, a second upper elastic member 150-2, a third upper elastic member 150-3 and a fourth upper elastic member 150-4, which are separated from one another and are conductively connected to the printed circuit board 250.

The upper elastic member 150 may further include a fifth upper elastic member 150-5 and a sixth upper elastic member 150-6, which are separated from each other and are conductively connected to the lower elastic member 160. Here, the respective upper elastic members 150 may be conductively isolated from one another so as to receive current having different polarities.

The lower elastic member 160 may include a first lower elastic member 160-1 and a second lower elastic member 160-2, which are separated from each other. Here, the first lower elastic member 160-1 may be conductively connected to the sixth upper elastic member 150-6, and the second lower elastic member 160-2 may be conductively connected to the fifth upper elastic member 150-5.

The upper elastic member 150 and the lower elastic member 160 may be conductively connected to each other via a conductive member 400. The conductive member 400 may include a first conductive member 400-1, which connects one of the fifth upper elastic member 150-5 and the sixth upper elastic member 150-6 and one of the first lower elastic member 160-1 and the second lower elastic member 160-2.

The conductive member 400 may further include a second conductive member 400-2, which connects the other of the fifth upper elastic member 150-5 and the sixth upper elastic member 150-6 and the other of the first lower elastic member 160-1 and the second lower elastic member 160-2.

As shown in FIGS. 17 and 18, by way of example, the first conductive member 400-1 conductively connects the sixth upper elastic member 150-6 and the first lower elastic member 160-1, and the second conductive member 400-2 conductively connects the fifth upper elastic member 150-5 and the second lower elastic member 160-2.

Each of the fifth upper elastic member 150-5 and the sixth upper elastic member 150-6 may include a first protruding frame 155, which is connected to the conductive member 400. Each of the first lower elastic member 160-1 and the second lower elastic member 160-2 may include a second protruding frame 165, which is formed at a position corresponding to the first protruding frame 155 in the first direction and which is connected to the conductive member 400. The first protruding frame 155, the second protruding frame 165 and the conductive member 400 may be securely coupled to one another by means of soldering, a conductive adhesive or the like. In order to ensure secure coupling between the first and second protruding frames 155 and 165 and the conductive member 400 and to facilitate the coupling work, each of the first and second protruding frames 155 and 165 may be provided with a hole or recess into which the conductive member 400 is fitted.

The conductive member 400 is preferably made of a flexible or elastic material such that the conductive member 400 flexes in the direction perpendicular to the length direction thereof when the bobbin 110 moves in the second and/or third directions.

The support members 220 may support the housing 300 such that the housing 300 is able to move with respect to the base 210 in the second and/or third directions, and may conductively connect at least one of the upper and lower elastic members 150 and 160 and the printed circuit board 250. The support member 220 may be integrally formed with two conductive wires 221. The support member 220 may include a plurality of support members. The plurality of support members 220 may be symmetrically disposed in the second and third directions. The specific structure of the support member 220 will now be described below.

Figure 19A:
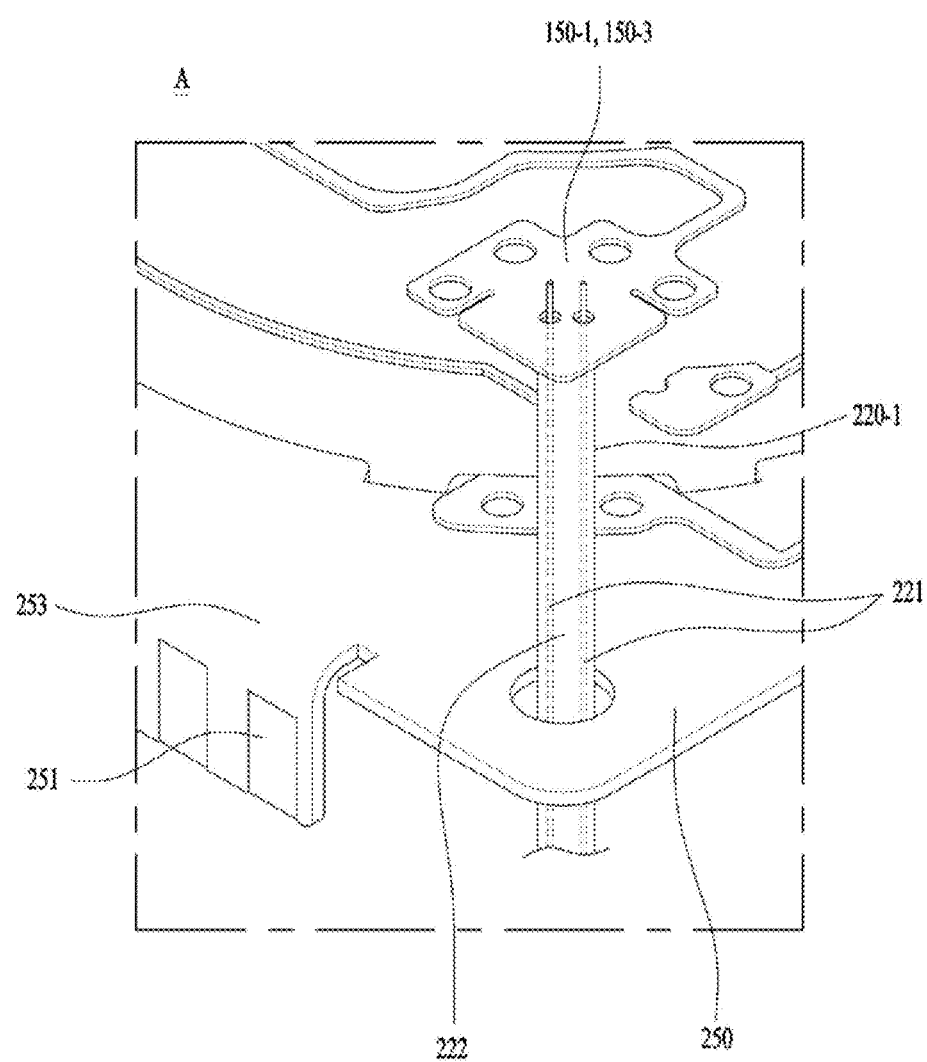
FIG. 19A is a perspective view of the area A of FIGS. 17 and 18.
Figure 19B:
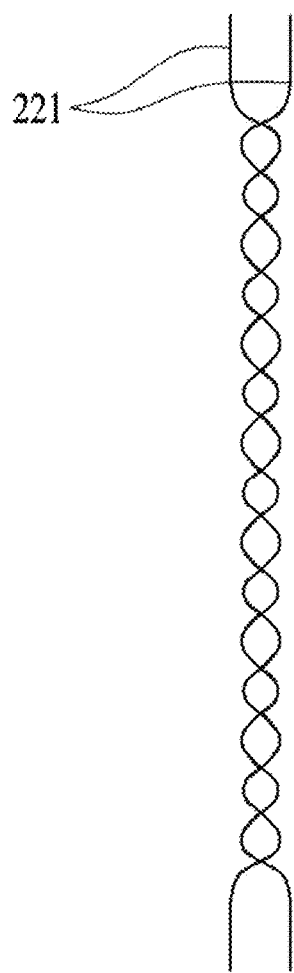
FIG. 19B is a view showing the support member according to an embodiment of the present invention.
Figure 19C:
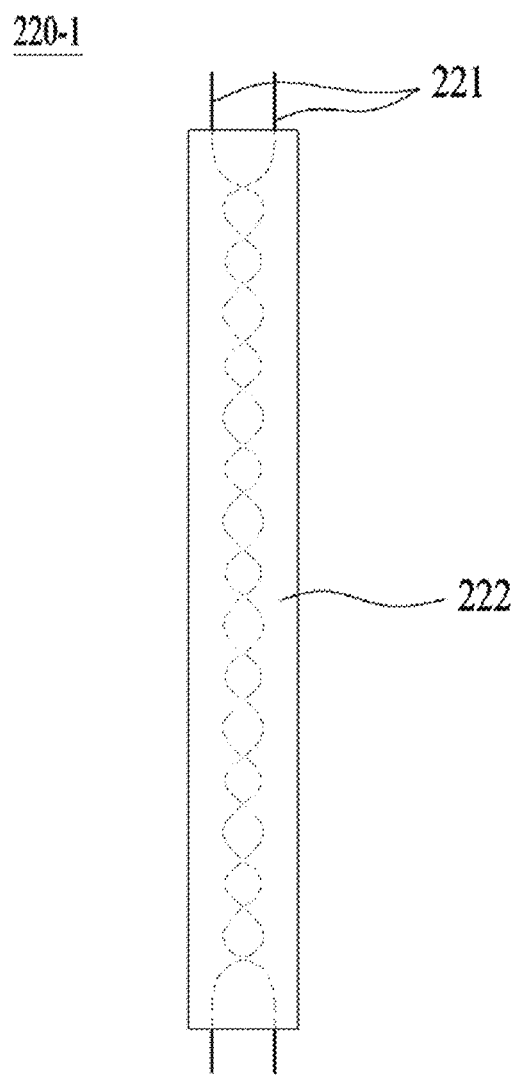
FIG. 19C is a view showing the support member according to another embodiment of the present invention.

FIG. 19A is a perspective view of the area A of FIGS. 17 and 18. FIG. 19B is a view showing the support member 220 according to an embodiment of the present invention. FIG. 19C is a view showing the support member 220 according to another embodiment of the present invention.

The support member 220 may include a first support member 220-1, at which the two conductive wires 221 are connected to one of the first to fourth upper elastic members 150-1, 150-2, 150-3 and 150-4. As shown in FIG. 19A, the first support member 220-1 may be connected to, for example, the first upper elastic member 150-1 or the third upper elastic member 150-3, which is directly connected to the printed circuit board 250 in a conductive manner.

Referring still to FIG. 19A, the first support member 220-1 may include an electrical insulation coating member 222 sheathing the two conductive wires 221, and the two conductive wires 221 may be conductively isolated from each other by means of the electrical insulation coating member 222.

The coating member 222 serves to conductively isolate the two conductive wires 221 and serves as a damper. Accordingly, when the first support member 220-1 is bent in the second and/or third directions during a handshake correction operation, the coating member 222 may alleviate impacts to which the conductive wires 221 and the first support member 220-1 including the conductive wires 221 are subjected.

As described above, the first support member 220-1 and the first upper elastic member 150-1 or the third upper elastic member 150-3 may be conductively connected to each other by means of a conductive adhesive, solder, or the like.

Alternatively, the first support member 220-1 may be constructed such that the two conductive wires 221 are conductively shorted. This is because, when one end of the first support member 220-1 is connected to one of the upper elastic members 150, for example, the first upper elastic member 150-1 or the third upper elastic member 150-3 in the embodiment, there is no problem even if the two conductive wires 221 are conductively shorted.

As shown in FIG. 19B, the first support member 220-1 may be constructed, for example, such that the two conductive wires 221 are twisted in the length direction thereof and are thus shorted.

Since the first support member 220-1 serves to elastically support movement of the housing 300 and the bobbin 110 in the second and/or third directions, like the upper elastic member 150 or the lower elastic member 160, the first support member 220-1 may need to have elasticity.

In this case, in consideration of performance and the operating characteristics of handshake correction of the lens moving apparatus, it is preferable to enable the elasticity of the first support member 220-1 to be controlled.

Accordingly, in the case in which the first support member 220-1 contains the two conductive wires 221, which are twisted, the elasticity of the first support member 220-1 may be controlled in such a manner as to control the extent of twisting of the two conductive wires 221, that is, the number of turns by which the two conductive wires 221 are twisted about the longitudinal axis.

Furthermore, it is possible to control the vibrational frequency in the second and/or third directions of the support member 220 during a handshake correction operation by controlling the elasticity of the first support member 220-1, and it is also possible to avoid mechanical resonance or reduce the maximum amplitude caused by the mechanical resonance by controlling the vibrational frequency.

Furthermore, it is possible to control the rigidity of the first support member 220-1 by controlling the extent of twisting of the two conductive wires 221.

Resistance of the conductive wires 221 is inversely proportional to the cross-sectional area thereof. Accordingly, when the two conductive wires 221 are conductively shorted, the total area of the conductive wires 221 is two times the area of a single wire, and the resistance of the conductive wires, which are shorted, decreases by half, compared to the resistance of conductive wires that are not shorted.

By virtue of the halving of the resistance, the amount of current that is consumed to perform handshake correction may be reduced. In other words, the reduction of resistance enables the amount of current required to perform handshake correction to be increased.

By virtue of the increased amount of current, the range of motion within which the support member 220 can move in the second and/or third directions for handshake correction may be increased. This is because the amount of current that flows through the support member 220 is proportional to the range of motion of the support member 220 in the second and/or third direction.

As shown in FIG. 19C, for example, the first support member 220-1 may be constructed such that the two conductive wires 221 are twisted in the length direction thereof so as to be shorted. The first support member 220-1 may include the electrical insulation coating member 222 sheathing the two conductive wires 221.

Figure 20A:
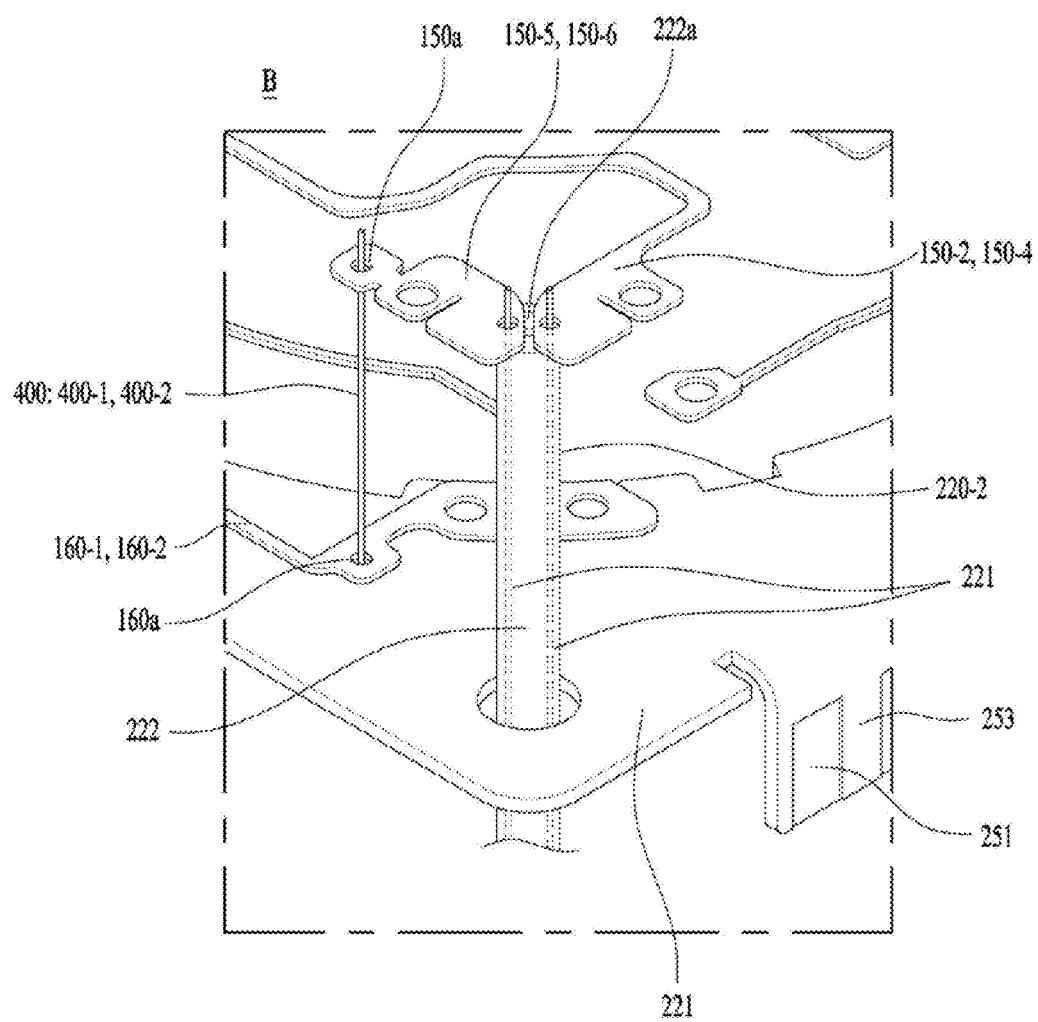
FIG. 20A is a perspective view showing the area B of FIG. 18.
Figure 20B:
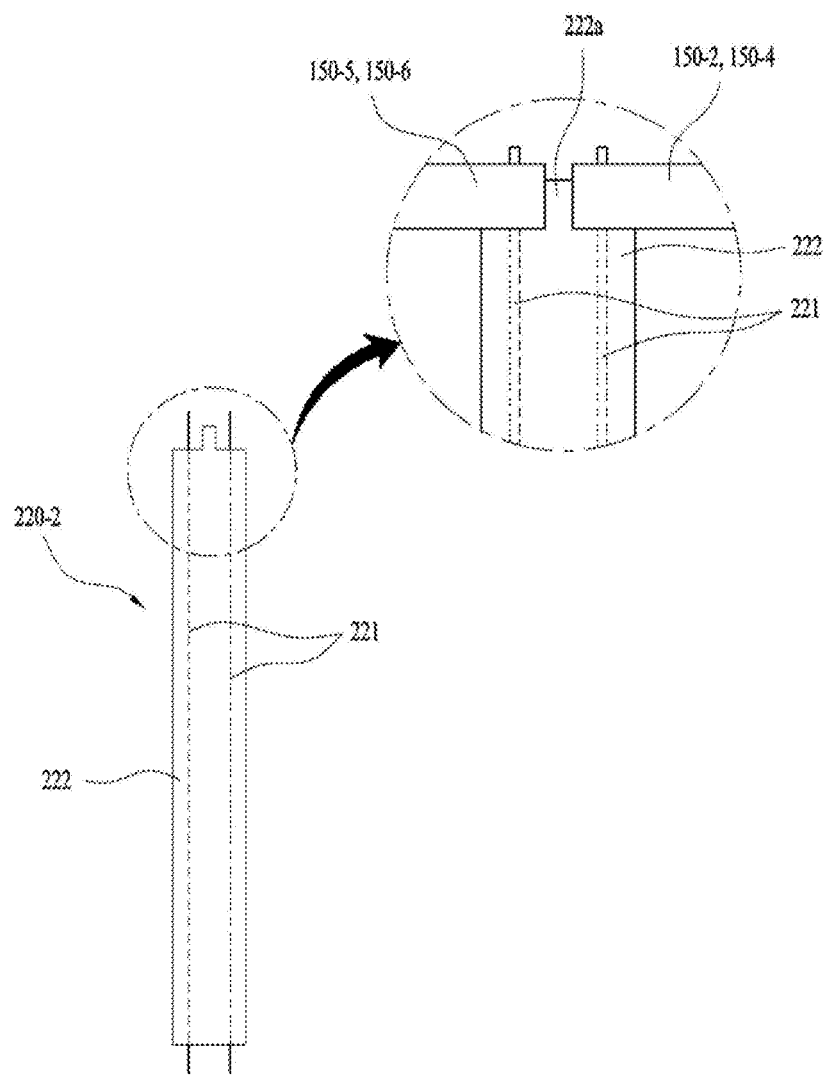
FIG. 20B is a view showing the support member according to another embodiment.

Accordingly, this embodiment may exhibit an effect which is obtained by the coating member 222 shown in FIG. 19A and an effect which is obtained by the two conductive wires 221, shown in FIG. 19B, which are twisted in the length direction thereof so as to be shorted. FIG. 20A is a perspective view showing the area B of FIG. 18. FIG. 20B is a view showing the support member 220 according to another embodiment.

The support member 220 according to another embodiment may include a second support member 220-2 in which one of the two conductive wires 221 is connected to one of the first upper elastic member 150-1, the second upper elastic member 150-2, the third upper elastic member 150-3 and the fourth upper elastic member 150-4, and the other of the two conductive wires 221 is connected to one of the fifth upper elastic member 150-5 and the sixth upper elastic member 150-6.

As shown in FIGS. 20A and 20B, the second support member 220-2 may be constructed, for example, such that one of the two conductive wires 221 is connected to the second upper elastic member 150-2, and the other of the two conductive wires 221 is connected to the fifth upper elastic member 150-5. Here, the second upper elastic member 150-2 and the fifth upper elastic member 150-5 may be disposed in the state of being conductively isolated from each other.

Furthermore, the second support member 220-2 may be constructed such that one of the two conductive wires 221 is connected to the fourth upper elastic member 150-4 and such that the other of the two conductive wires 221 is connected to the sixth upper elastic member 150-6. Here, the fourth upper elastic member 150-4 and the sixth upper elastic member 150-6 may be disposed in the state of being conductively isolated from each other.

The second support member 220-2 may include the electrical insulation coating member 222 sheathing the two conductive wires 221, and the two conductive wires 221 may be conductively isolated from each other by means of the coating member 222. One of the fifth upper elastic member 150-5 and the sixth upper elastic member 150-6 may be separated from the other, and may be conductively connected to the other via the second support member 220-2. Accordingly, there is a need to dispose the fifth upper elastic member 150-5 and the sixth upper elastic member 150-6 such that one of the fifth upper elastic member 150-5 and the sixth upper elastic member 150-6 is not in direct contact with the other. To this end, a projecting insulator 222a may be provided at the upper end of the second support member 220-2 where the upper elastic members 150 are connected to the second support member 220-2.

As shown in FIG. 20B, the projecting insulator 222a may be formed by projecting a portion of the coating member 222 of one end of the second support member 220-2, and may be disposed between the two conductive wires 221. The projecting insulator 222a may serve to space the upper elastic members 150 apart from each other so as to conductively isolate them from each other.

When one of the two conductive wires 221 of the second support member 220-2 is connected to one of the fifth upper elastic member 150-5 and the sixth upper elastic member 150-6, and the other of the two conductive wires 221 is connected to the other of the fifth upper elastic member 150-5 and the sixth upper elastic member 150-6, the projecting insulator 222a may be disposed between the adjacent fifth and sixth upper elastic members 150-5 and 150-6 so as to space the adjacent fifth and sixth upper elastic members 150-5 and 150-6 apart from each other by a predetermined distance.

By virtue of the projecting insulator 222a having such a structure, the fifth upper elastic member 150-5 and the sixth upper elastic member 150-6 are positioned close to each other in the state of being separated from each other, thereby inhibiting the occurrence of shorts between the fifth upper elastic member 150-5 and the sixth upper elastic member 150-6.

Like the coating member 222 of the first support member 220-1, the coating member 222 of the second support member 220-2 may serve to conductively insulate the two conductive wires 221 from each other, and may serve as a damper. Accordingly, when the second support member 220-2 is bent in the second and/or third directions during a handshake correction operation, the coating member 222 may alleviate impacts to which the conductive wires 221 and the second support member 220-2 including the conductive wires 221 are subjected.

Figure 22A:
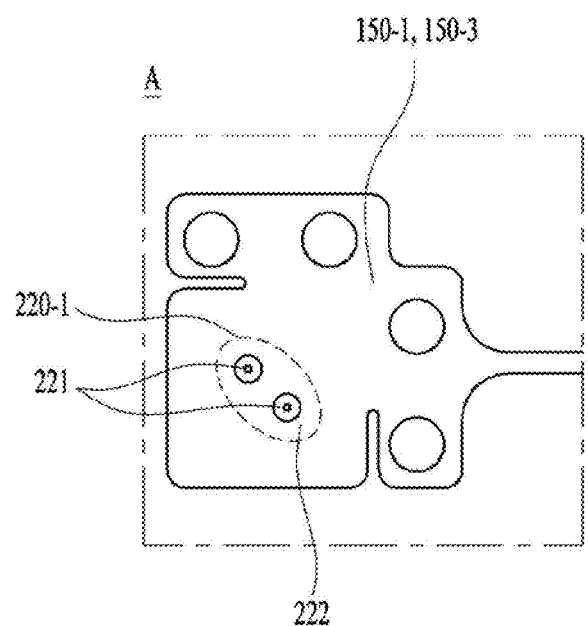
FIGS. 22A and 22B are plan views showing the area A of FIG. 21.
Figure 22B:
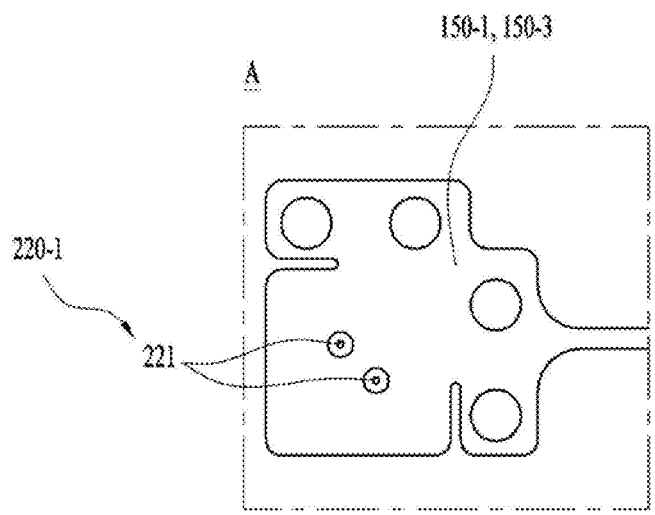
Figure 23:
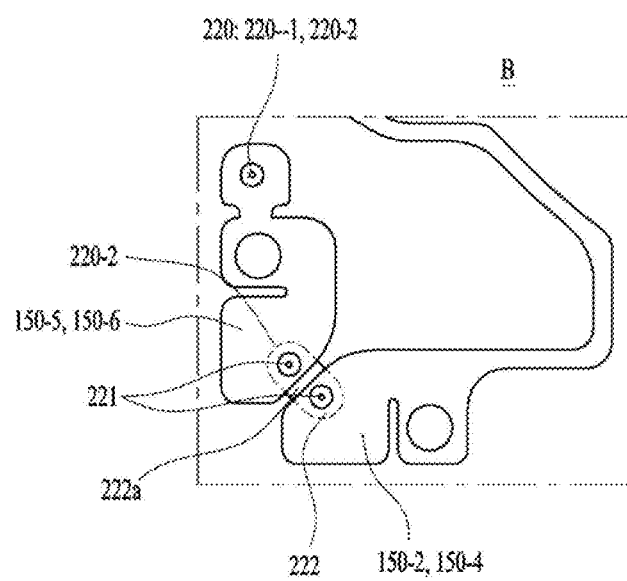
FIG. 23 is a plan view showing the area B of FIG. 21.

Like the first support member, the second support member 220-2 may be conductively connected to the upper elastic member 150 by means of a conductive adhesive, solder or the like. FIG. 21 is a plan view of FIG. 18. FIGS. 22A and 22B are plan views showing the area A of FIG. 21. FIG. 23 is a plan view showing the area B of FIG. 21.

As shown in FIG. 21, according to the embodiment, the first support member 220-1 may be connected to the first upper elastic member 150-1 or the third upper elastic member 150-3. Accordingly, a total of two first support members 220-1 may be provided in the embodiment. According to the embodiment, one of the two conductive wires 221 of the second support member 220-2 may be connected to the second upper elastic member 150-2, and the other of the two conductive wires 221 may be connected to the fifth upper elastic member 150-5. One of the two conductive wires 221 of the second support member 220-2 may be connected to the fourth upper elastic member 150-4, and the other of the two conductive wires 221 may be connected to the sixth upper elastic member 150-6. Accordingly, a total of two second support members 220-2 may be provided in the embodiment.

Ultimately, a total of four support members 220 including the two first support members 220-1 and the two second support members 220-2, may be provided in the embodiment.

As shown in FIG. 22A, in one embodiment, the upper end of the first support member 220-1 may be conductively connected to one of the first upper elastic member 150-1 and the second upper elastic member 150-2.

Although the support member 220 is illustrated in FIG. 22A as having an approximately elliptical cross-sectional shape, the embodiments are not limited thereto. The support member 220 may have various other cross-sectional shapes, such as a circular shape or a polygonal shape. As shown in FIG. 22B, another embodiment of the first support member 220-1 may include the two conductive wires 221, which are twisted, without the coating member 222, as described above with reference to FIG. 19B.

In this embodiment, although the first support member 220-1 does not include the coating member 222, the upper end of the first support member 220-1 may be connected to the first upper elastic member 150-1 or the second upper elastic member 150-2 via the two conductive wires 221, as in the embodiment shown in FIG. 8.

As shown in FIG. 23, in one embodiment, the second support member 220-2 may be connected at the upper end thereof to the second upper elastic member 150-2 and the fifth upper elastic member 150-5. Here, one of the conductive wires contained in the second support member 220-2 may be connected to the second upper elastic member 150-2, and the other of the conductive wires may be connected to the fifth upper elastic member 150-5.

The upper end of the second support member 220-2 may be connected to the fourth upper elastic member 150-4 and the sixth upper elastic member 150-6. One of the conductive wires contained in the second support member 220-2 may be connected to the fourth upper elastic member 150-4, and the other of the conductive wires may be connected to the sixth upper elastic member 150-6.

As in the preceding embodiment, although the second support member 220-2 is illustrated in FIG. 23 as having an approximately elliptical cross-sectional shape, the embodiments are not limited thereto. The second support member 220-2 may have various other cross-sectional shapes, such as a circular shape or a polygonal shape.

The projecting insulator 222*a* may be disposed, for example, between the second upper elastic member 150-2 and the fifth upper elastic member 150-5, or between the fourth upper elastic member 150-4 and the sixth upper elastic member 150-6 such that the adjacent upper elastic members are spaced apart from each other by a predetermined distance without contact therebetween, and are conductively isolated from each other.

The coating member 222 sheathing the conductive wires 221 or the projecting insulator 222*a* formed on the coating member 222 may be made of any material that is electrically insulative. For example, in consideration of ease of manufacture, the cost of manufacturing the support member 220 and the like, the coating member 222 or the projecting insulator 222*a* may be made of a polymer-based material.

The lens moving apparatus according to this embodiment may be incorporated in devices in various fields, for example, a camera module. Such a camera module may be applied to mobile devices such as cellular phones.

The camera module according to this embodiment may include the lens barrel coupled to the bobbin 110, an image sensor (not shown), a printed circuit board 250, and an optical system. The lens barrel may be constructed as described above, and the printed circuit board 250 may constitute the bottom surface of the camera module, starting from the area on which the image sensor is mounted.

The optical system may include at least one lens for transmitting images to the image sensor. The optical system may be provided with an actuator module capable of fulfilling autofocusing and handshake correction functions. The actuator module for fulfilling the autofocusing function may be constructed in various fashions, but mainly adopts a voice coil unit motor. The lens moving apparatus according to this embodiment may serve as an actuator module for fulfilling both autofocusing and handshake correction functions.

The camera module may further include an infrared ray screening filter (not shown). The infrared ray screening filter serves to shield the image sensor from light in the infrared range. In this case, the base 210, which is illustrated in FIG. 2, may be provided with the infrared ray screening filter at a position corresponding to the image sensor, and the infrared ray screening filter may be coupled to the base 210 by means of a holder member (not shown). Furthermore, the base 210 may support the lower portion of the holder member.

The base 210 may be provided with an additional terminal member for connection with the printed circuit board 250, and the terminal member may be integrally formed using a surface electrode. The base 210 may serve as a sensor holder for protecting the image sensor. In this case, although the base 210 may be provided along the lateral side surface thereof with protrusions projecting downward, these are not essential components. Although not shown in the drawings, an additional sensor holder disposed under the base 210 may fulfill the function of the protrusions.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:
1. A lens moving apparatus, comprising:
a housing comprising a first through hole;
a bobbin disposed in the housing;
a first coil disposed on the bobbin;
a first magnet disposed on the housing and opposite to the first coil;
a first sensor disposed on the housing and configured to detect displacement of the bobbin in an optical axis direction;
an upper elastic member coupled to both an upper surface of the bobbin and the housing;
a base disposed to be spaced apart from the housing;
a circuit member disposed between the base and the housing and comprising a second coil disposed to face the first magnet;
a second sensor configured to detect displacement of the housing in a direction perpendicular to the optical axis direction;
a support member configured to support the housing such that the housing is movable in the direction perpendicular to the optical axis direction, the support member conductively connecting the upper elastic member to the circuit member; and
a damping material disposed on the housing and the support member,
wherein the support member extends through the first through hole of the housing and is connected to the upper elastic member,
wherein the housing comprises a first recess under the first through hole, and
wherein the damping material is disposed in the first recess of the housing.
2. The lens moving apparatus according to claim 1, wherein the damping material is attached with the support member,
wherein the bobbin comprises a first stopper protruding from an outer circumferential surface thereof in a radial direction, and
wherein the housing comprises a first mounting recess formed at a position corresponding to the first stopper.
3. The lens moving apparatus according to claim 1, wherein the second coil is formed on the circuit member in a form of a circuit pattern.
4. The lens moving apparatus according to claim 1, comprising a sensor magnet disposed on the bobbin and disposed opposite to the first sensor,
wherein the first coil is wound on an outer circumferential surface of the bobbin,
wherein the second coil is formed on the circuit member in a form of a circuit pattern, wherein the first recess is formed by an outer lateral surface of the housing and a lower surface of the housing, and wherein the damping material is attached with at least one of the outer lateral surface of the housing and the lower surface of the housing.

5. The lens moving apparatus according to claim 1, wherein the housing includes four first side portions and four second side portions, wherein the four second side portions are disposed on four corners of the housing, respectively, and wherein each of the four second side portions has a smaller area than each of the four first side portions.

6. The lens moving apparatus according to claim 1, comprising a lower elastic member coupled to the bobbin and the housing and positioned lower than the upper elastic member, wherein the lower elastic member comprises first and second lower elastic members, which are spaced apart from each other, and wherein a power is configured to be supplied to the first coil through the first and second lower elastic members.

7. The lens moving apparatus according to claim 1, wherein the upper elastic member comprises a first upper elastic member, a second upper elastic member, a third upper elastic member, and a fourth upper elastic member, and the first to fourth upper elastic members are spaced apart from one another, and wherein the support member comprises:
a first support member electrically connecting the first upper elastic member to the circuit member;
a second support member electrically connecting the second upper elastic member to the circuit member;
a third support member electrically connecting the third upper elastic member to the circuit member; and
a fourth support member electrically connecting the fourth upper elastic member to the circuit member.

8. The lens moving apparatus according to claim 7, wherein the first sensor is connected to the first to fourth support members through the first to fourth upper elastic members, respectively.

9. The lens moving apparatus according to claim 7, wherein the first upper elastic member comprises:
a first inner frame coupled to the bobbin;
a first outer frame coupled to the housing and connected to the first support member; and
a first frame connector connecting the first inner frame to the first outer frame, wherein the second upper elastic member comprises:
a second inner frame coupled to the bobbin;
a second outer frame coupled to the housing and connected to the second support member; and
a second frame connector connecting the second inner frame to the second outer frame.

10. The lens moving apparatus according to claim 7, wherein the first recess comprises four recesses formed on four corner portions of the housing, respectively, and wherein the first and fourth support members are disposed on the four recesses, respectively.

11. The lens moving apparatus according to claim 1, wherein the first through hole comprises four through holes and the four through holes are disposed at the four corners of the housing, respectively.

12. The lens moving apparatus according to claim 1, wherein the first coil comprises a flat surface disposed to face the first magnet, wherein the circuit member comprises a bent portion, and wherein the bent portion of the circuit member comprises a terminal pad.

13. The lens moving apparatus according to claim 1, comprising a sensor substrate and a sensor magnet disposed on the bobbin and disposed opposite to the first sensor, wherein the second coil is spaced apart from the first magnet by a predetermined distance, wherein the first sensor is configured to sense the sensor magnet, wherein the upper elastic member comprises a first upper elastic member, a second upper elastic member, a third elastic member, and a fourth upper elastic member, wherein the first to fourth upper elastic members are spaced apart from one another, wherein the sensor substrate comprises:
a body on which the first sensor is disposed;
a plurality of elastic member contacts comprising a first elastic member contact conductively connected to the first upper elastic member, a second elastic member contact conductively connected to the second upper elastic member, a third elastic member contact conductively connected to the third upper elastic member, and a fourth elastic member contact conductively connected to the fourth upper elastic member; and
circuit patterns formed on the body and conductively connecting the first sensor and the first to fourth elastic member contacts, and wherein the second coil comprises a finely patterned coil.

14. The lens moving apparatus according to claim 1, comprising a lower elastic member coupled to both a lower surface of the bobbin and the housing, wherein a first length, which is the shortest distance between a lower surface of the upper elastic member and an upper surface of a lower elastic member, is shorter than a second length that is a length of the support member, which is the shortest distance between the lower surface of the upper elastic member and an upper surface of the circuit member.

15. The lens moving apparatus according to claim 1, wherein the first through hole of the housing is connected to the first recess of the housing.

16. A camera module, comprising:
the lens moving apparatus of claim 1;
a lens barrel coupled to the bobbin;
a sensor circuit member; and
an image sensor disposed on the sensor circuit member.

17. A lens moving apparatus, comprising:
a housing comprising first through holes;
a bobbin disposed in the housing;
a first coil disposed on the bobbin;
a first magnet disposed on the housing and opposite to the first coil;
a first sensor disposed on the housing and configured to detect displacement of the bobbin in an optical axis direction;
an upper elastic member coupled to the bobbin and an upper surface of the housing;
a base disposed to be spaced apart from the housing;
a circuit member disposed between the base and the housing and comprising a second coil disposed to face the first magnet;
two second sensors configured to detect displacement of the housing in a direction perpendicular to the optical axis direction;
a plurality of support members configured to support the housing such that the housing is movable in the direction perpendicular to the optical axis direction, the plurality of support members conductively connecting the upper elastic member to the circuit member; and a damping material disposed on the housing and the plurality of support members, wherein the plurality of support members extends through the first through holes of the housing and connect to the upper elastic member, respectively, wherein the housing comprises first recesses under the first through holes, respectively, and wherein the damping material is disposed in the first recesses of the housing.

18. The lens moving apparatus according to claim 17, wherein each of the first recesses is formed by an outer lateral surface of the housing and a lower surface of the housing, and wherein the damping material is attached with at least one of the outer lateral surface of the housing and the lower surface of the housing.

19. The lens moving apparatus according to claim 17, wherein the first through holes of the housing are connected to the first recesses of the housing, respectively.

* * * * *